(12) United States Patent
Murayama

(10) Patent No.: US 9,645,367 B2
(45) Date of Patent: May 9, 2017

(54) ZOOM LENS SYSTEM

(71) Applicant: RICOH IMAGING COMPANY, LTD., Tokyo (JP)

(72) Inventor: Minoru Murayama, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/109,527

(22) PCT Filed: Dec. 5, 2014

(86) PCT No.: PCT/JP2014/082211
§ 371 (c)(1),
(2) Date: Jul. 1, 2016

(87) PCT Pub. No.: WO2015/102071
PCT Pub. Date: Jul. 9, 2015

(65) Prior Publication Data
US 2016/0327774 A1 Nov. 10, 2016

(30) Foreign Application Priority Data

Jan. 6, 2014 (JP) ................................. 2014-000162

(51) Int. Cl.
*G02B 9/60* (2006.01)
*G02B 15/163* (2006.01)
(Continued)

(52) U.S. Cl.
CPC ............. *G02B 15/163* (2013.01); *G02B 9/60* (2013.01); *G02B 13/0045* (2013.01);
(Continued)

(58) Field of Classification Search
CPC .............................. G02B 9/60; G02B 13/0045
(Continued)

(56) References Cited

U.S. PATENT DOCUMENTS 5,508,847 A * 4/1996 Suzuki ................. G02B 15/17
359/683
6,865,027 B2 3/2005 Shirasuna
(Continued)

FOREIGN PATENT DOCUMENTS

JP 2000-47107 2/2000
JP 2003-215457 7/2003
(Continued)

OTHER PUBLICATIONS

International Search Report, along with English-language translation thereof, for PCT/JP2014/082211 dated Feb. 17, 2015.

*Primary Examiner* — William Choi
(74) *Attorney, Agent, or Firm* — Greenblum & Bernstein, P.L.C.

(57) ABSTRACT

A zoom lens system includes a positive first lens group, a negative second lens group, a third lens group including at least one positive lens element or one negative lens element, a positive fourth lens group, and a negative fifth lens group, in that order from the object side. At least the first, second, fourth and fifth lens groups are moved during zooming from the short to long focal length extremities, and the following conditions (1) and (2) are satisfied:

$$-6.5 < f1/f5 < -4.6 \quad (1),$$

and $$-1.2 < fw/f3 < 0.7 \quad (2),$$

wherein f1, f3 and f5 designate the focal lengths of the first and fifth lens groups, respectively, and fw designates the focal length of the entire zoom lens system at the short focal length extremity.

8 Claims, 29 Drawing Sheets

(51) Int. Cl.
*G02B 13/00* (2006.01)
*G02B 15/17* (2006.01)
*G02B 15/173* (2006.01)
*G02B 27/00* (2006.01)
*G03B 17/56* (2006.01)

(52) U.S. Cl.
CPC ........... *G02B 15/17* (2013.01); *G02B 15/173* (2013.01); *G02B 27/0025* (2013.01); *G03B 17/565* (2013.01)

(58) Field of Classification Search
USPC .................................................. 359/763, 764
See application file for complete search history.

(56) References Cited

U.S. PATENT DOCUMENTS

| | | |
|---|---|---|
| 2003/0142412 A1 | 7/2003 | Shirasuna |
| 2009/0195885 A1 | 8/2009 | Yamanaka et al. |
| 2011/0007403 A1 | 1/2011 | Matsuo |
| 2011/0019288 A1 | 1/2011 | Yamanaka et al. |
| 2013/0242171 A1 | 9/2013 | Kurioka et al. |

FOREIGN PATENT DOCUMENTS

| | | |
|---|---|---|
| JP | 2003-344768 | 12/2003 |
| JP | 4115746 | 7/2008 |
| JP | 4227223 | 2/2009 |
| JP | 2009-168933 | 7/2009 |
| JP | 2011-17912 | 1/2011 |
| JP | 2012-88366 | 5/2012 |
| JP | 2013-218299 | 10/2013 |

* cited by examiner

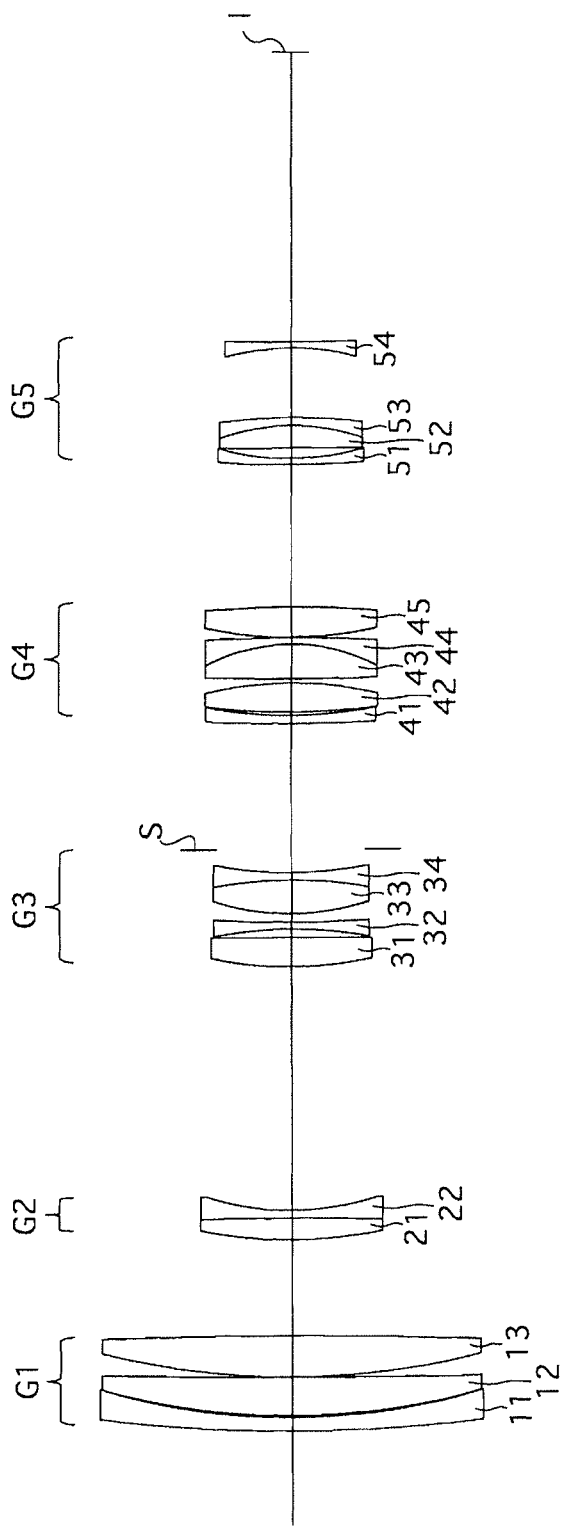

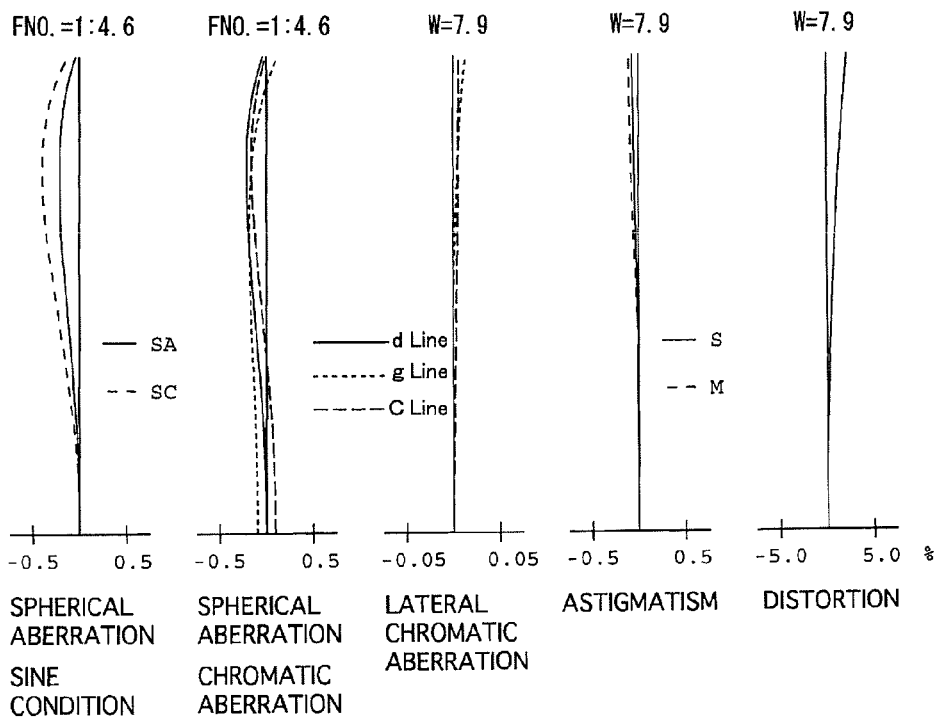
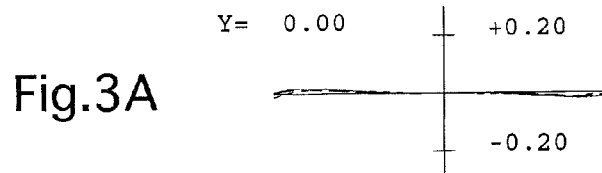
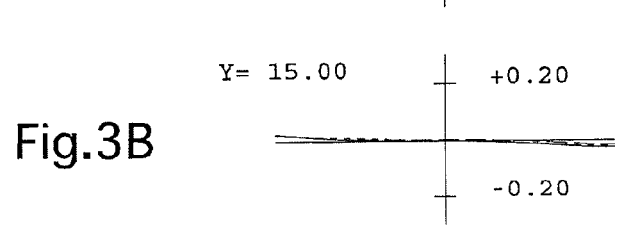
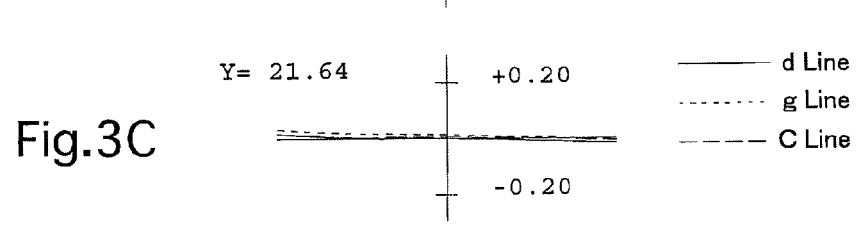

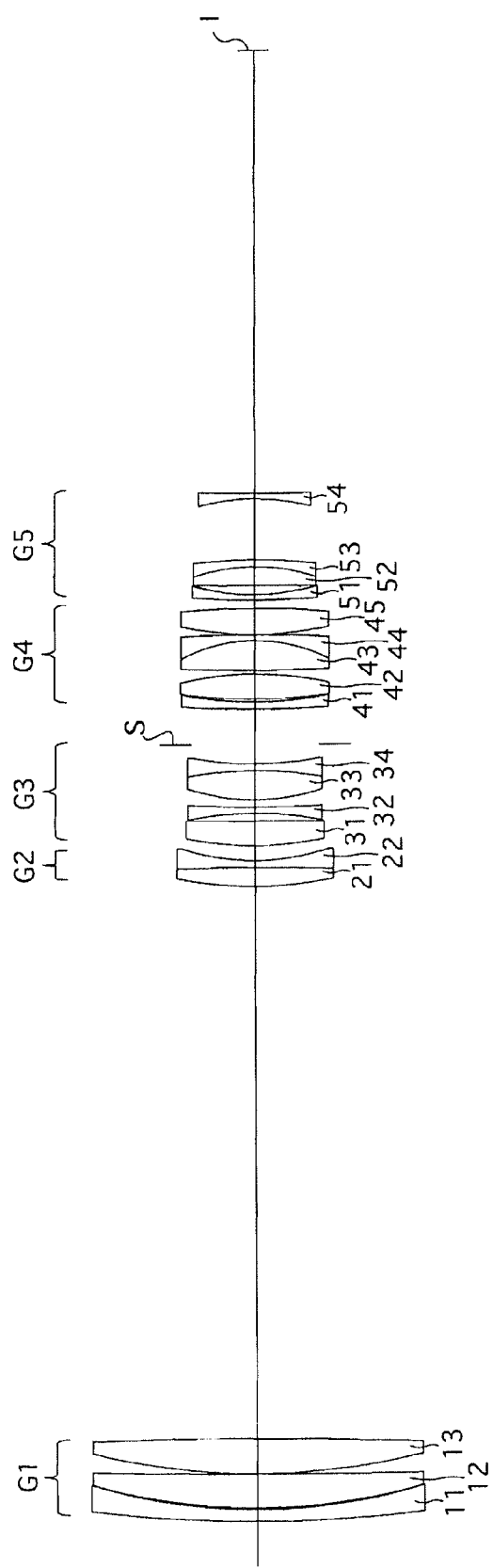

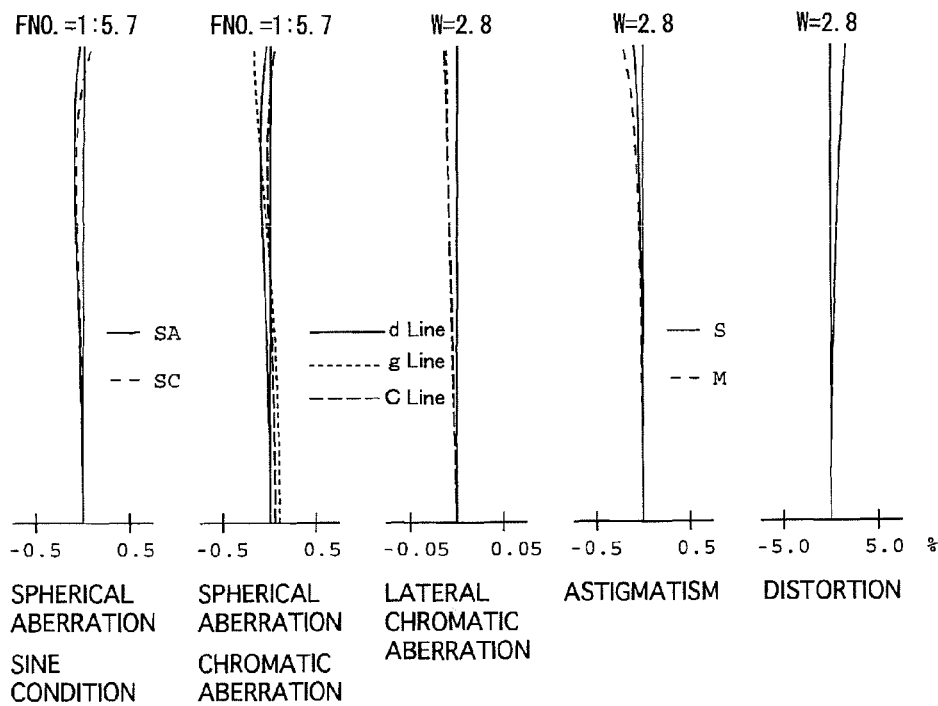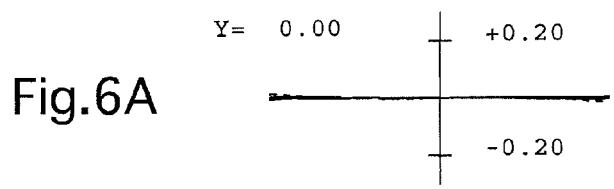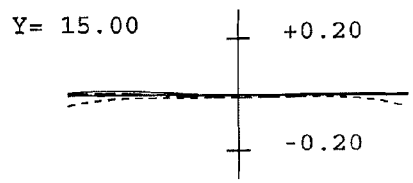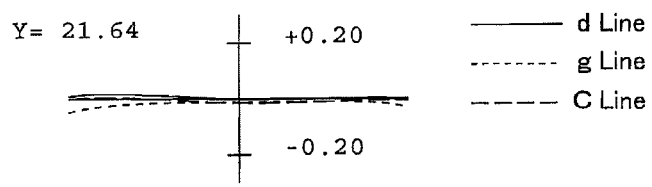

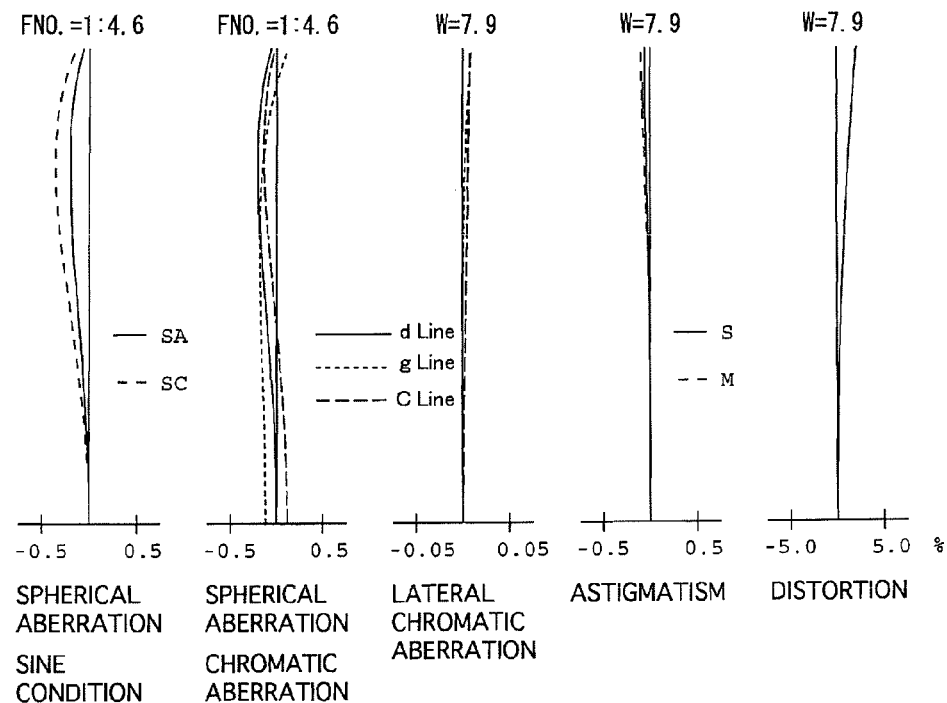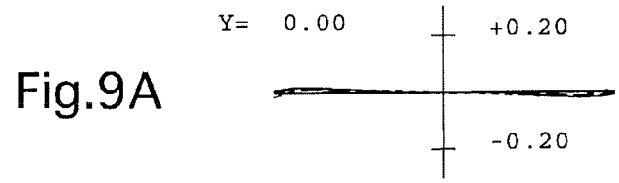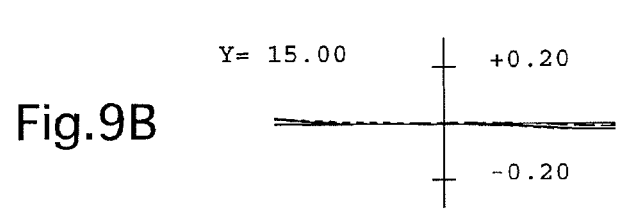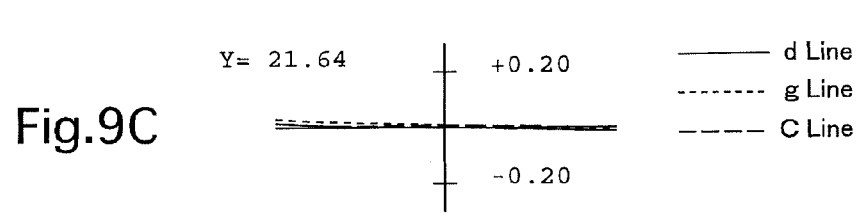

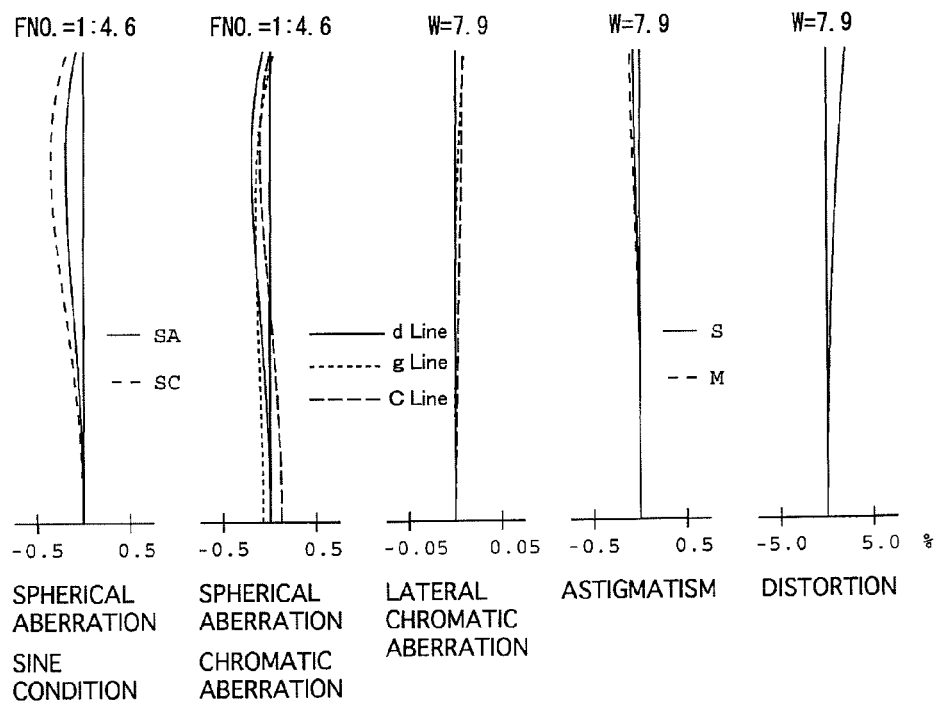
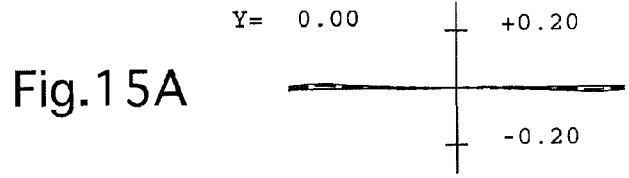
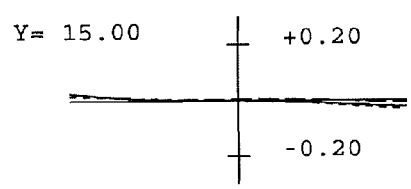
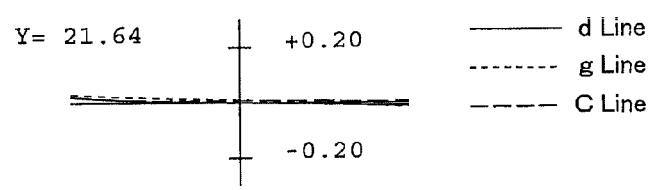

| SPHERICAL ABERRATION SINE CONDITION | SPHERICAL ABERRATION CHROMATIC ABERRATION | LATERAL CHROMATIC ABERRATION | ASTIGMATISM | DISTORTION |

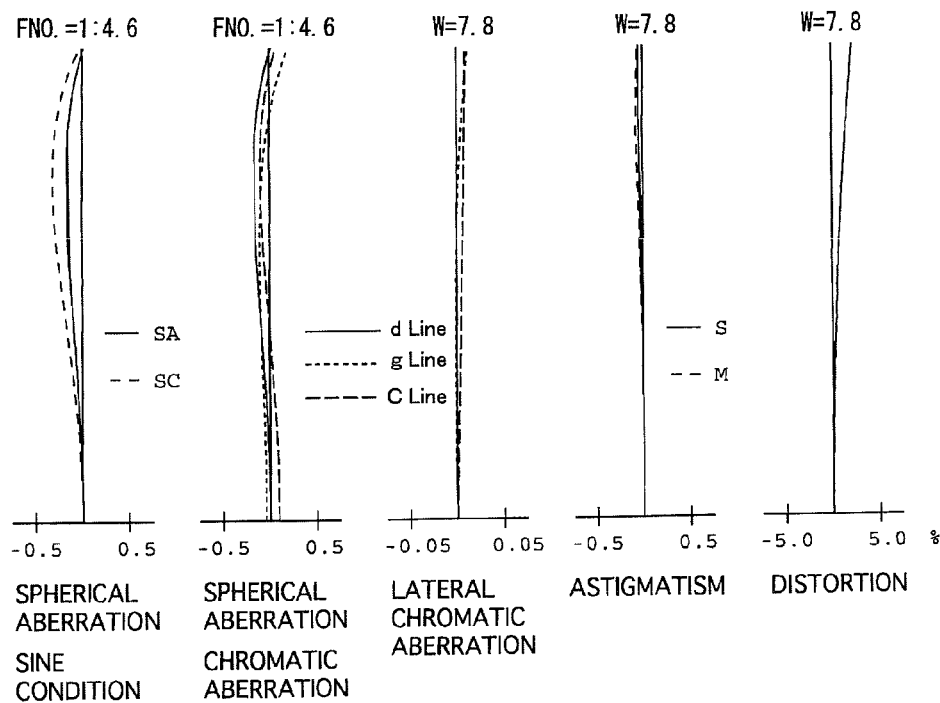
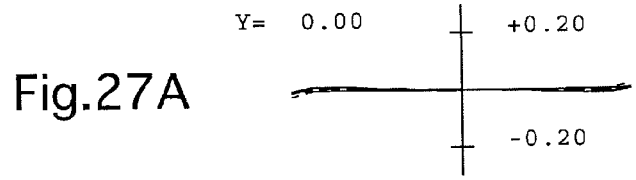
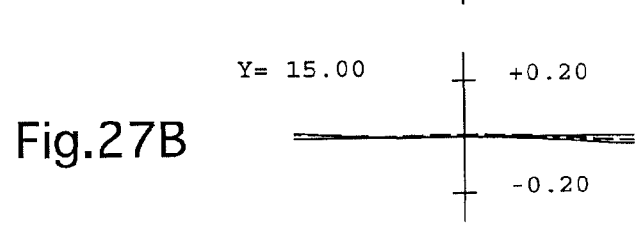
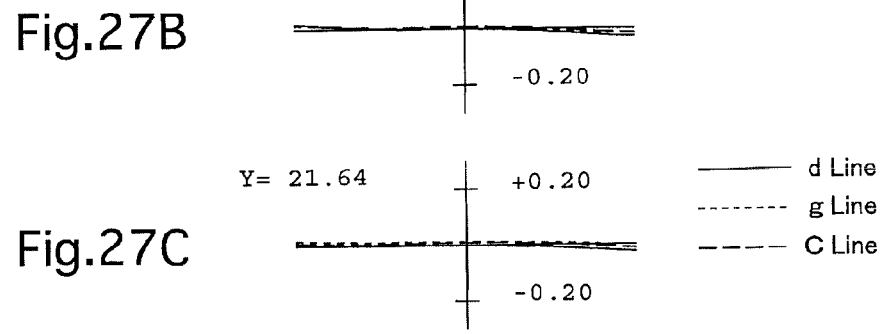

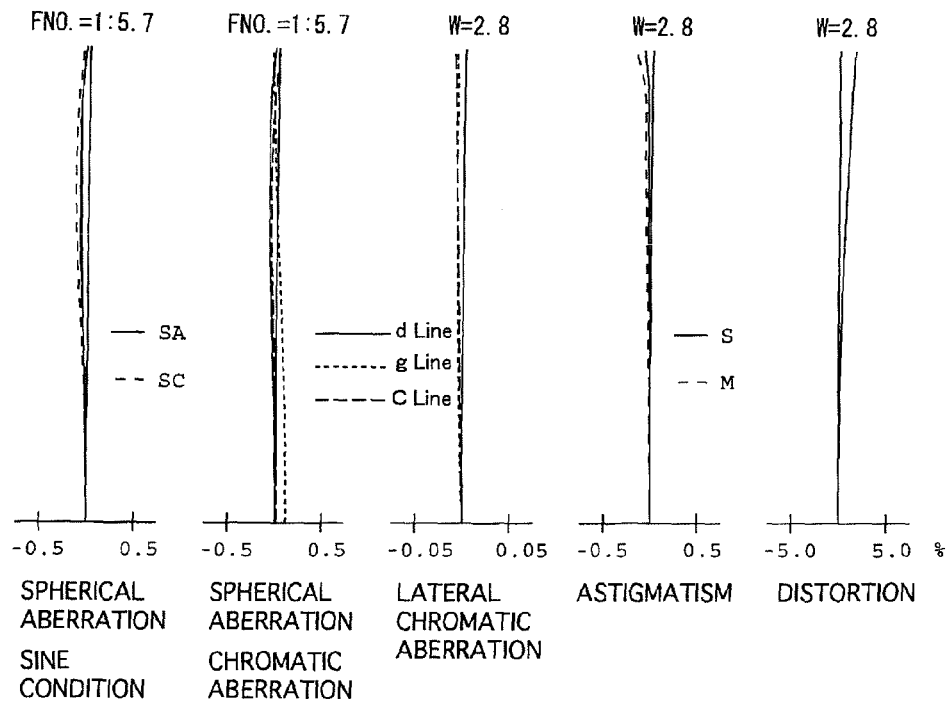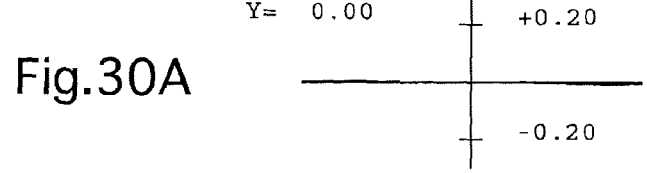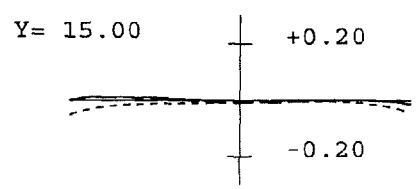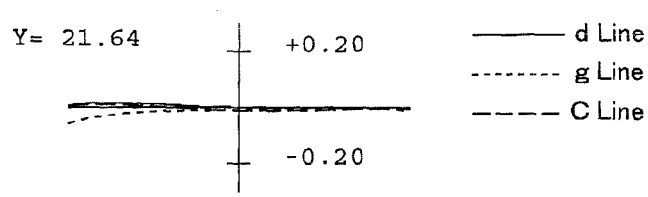

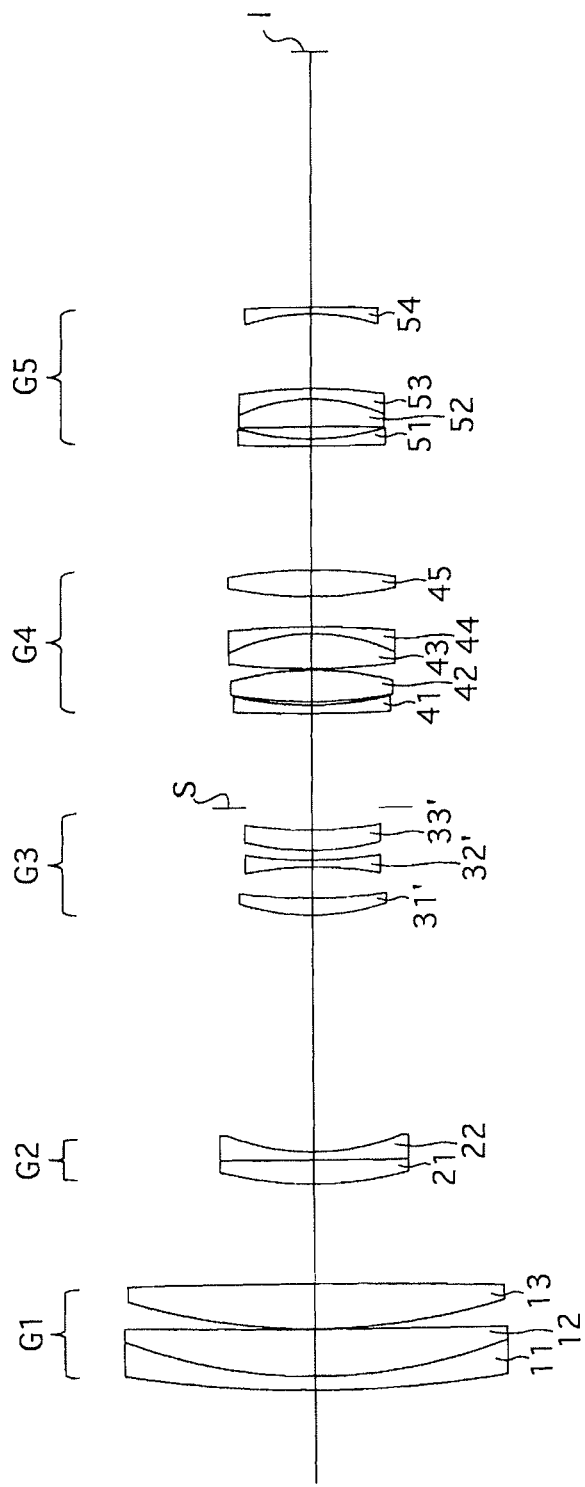

Fig.35A Fig.35B Fig.35C Fig.35D Fig.35E
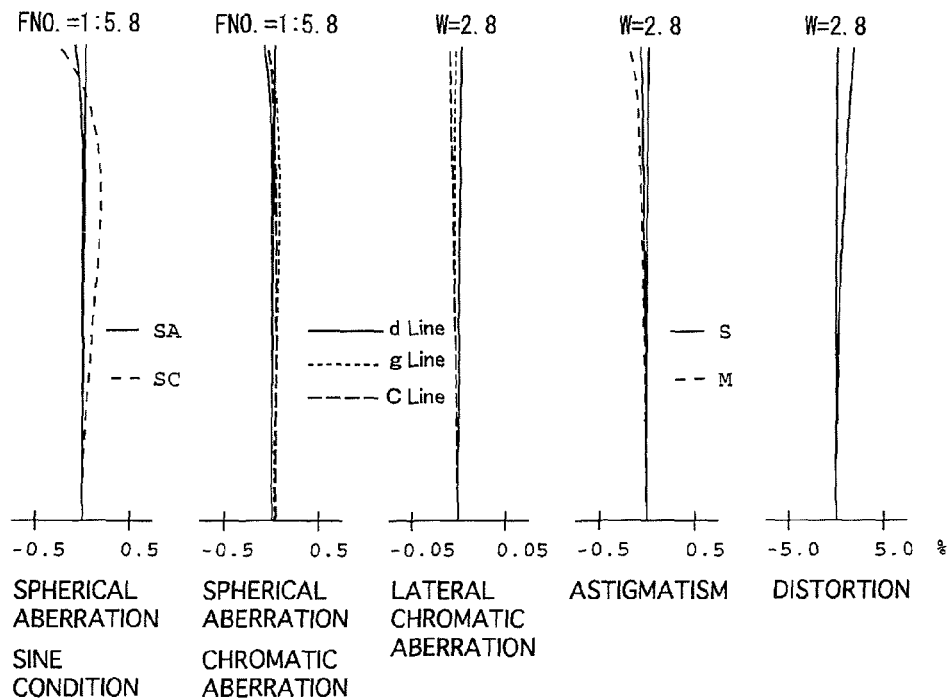
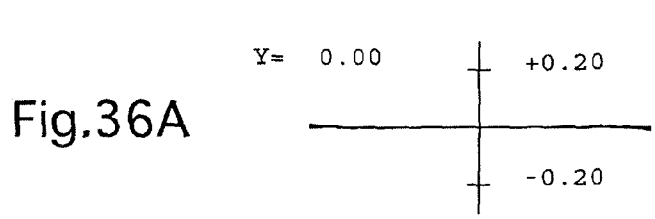
Fig.36A
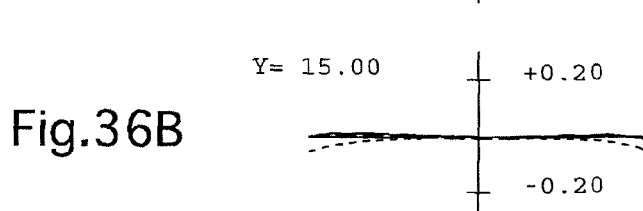
Fig.36B
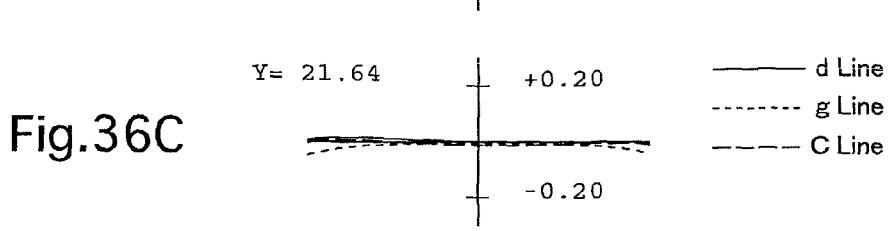
Fig.36C SPHERICAL ABERRATION SINE CONDITION | SPHERICAL ABERRATION CHROMATIC ABERRATION | LATERAL CHROMATIC ABERRATION | ASTIGMATISM | DISTORTION

ZOOM LENS SYSTEM

TECHNICAL FIELD

The present invention relates to a zoom lens system including an ultra telescopic range suitable for use in a lens interchangeable camera, such as a digital SLR camera, etc.

BACKGROUND ART

A telephoto type of zoom lens configuration having five or more lens groups, in which the power of the first lens group is positive and the power of the rearmost lens group is negative, is often used as a so-called ultra telescopic zoom lens system, in which the focal length at the long focal length extremity exceeds 400 mm (converted to 35 mm format). In order to be applied for autofocusing, this type of ultra telescopic zoom lens system often uses, as a focusing method for focusing on an object at infinity to an object at a close distance, an internal focusing method in which the lens groups between the first lens group and the rearmost lens group are moved in the optical axis direction thereof, or often uses a rear-focusing method in which the rearmost lens group is moved in the optical axis direction.

In a telephoto zoom lens system, since axial chromatic aberration and lateral chromatic aberration become large at the long focal length extremity, there is a requirement for such aberrations to be favorably corrected. Furthermore, telephoto zoom lens systems are sometimes required to have specifications in which the f-number is faster than 6.0 at the long focal length extremity; accordingly, spherical aberration is also required to be favorably corrected. However, in a so-called ultra telephoto zoom lens system in which the focal length at the long focal length extremity exceeds 400 mm, there is a tendency for axial chromatic aberration, lateral chromatic aberration and spherical aberration to increase, thereby deteriorating the optical quality. Furthermore, in the case where a telephoto zoom lens system is used in an interchangeable lens camera of a digital SLR camera, since the lens diameter of the rear lens group cannot be enlarged due to mount restrictions, the quantity of peripheral light at the long focal length extremity decreases.

Patent Literature No. 1 discloses a zoom lens system having a configuration of six lens groups, i.e., a positive lens group, a negative lens group, a positive lens group, a negative lens group, a positive lens group and a negative lens group. The zoom lens system of Patent Literature No. 1 utilizes a floating focusing system in which five lens groups (a first lens group, a third lens group, a fourth lens group, a fifth lens group and a sixth lens group) are moved in the optical axis direction during zooming, and two lens groups (the fourth lens group and the sixth lens group) are moved in the optical axis direction during focusing. Accordingly, the entire mechanism, which includes a zooming mechanism and a focusing mechanism, becomes enlarged, has an increased weight and increased complexity. Furthermore, in the zoom lens system of Patent Literature No. 1, a large amount of spherical aberration and field curvature occur during focusing, thereby deteriorating the optical quality.

Patent Literature No. 2 discloses a zoom lens system having a configuration of five lens groups, i.e., a positive lens group, a negative lens group, a positive lens group, a positive lens group and a negative lens group, in which all five lens groups move in the optical axis direction during zooming, and a zoom lens system having a configuration of six lens groups, i.e., a positive lens group, a negative lens group, a positive lens group, a positive lens group, a positive lens group and a negative lens group, in which all six lens groups move in the optical axis direction during zooming. However, in the zoom lens system of Patent Literature No. 2, the entire mechanism including a zooming mechanism becomes enlarged, has an increased weight, increased complexity, and a large amount of spherical aberration occurs at the long focal length extremity, thereby deteriorating the optical quality.

Patent Literature No. 3 discloses a zoom lens system configured of five lens groups, i.e., a positive lens group, a negative lens group, a positive lens group, a positive lens group and a negative lens group, and in which a diaphragm is moved independently of each lens group in the optical axis direction. In the zoom lens system of Patent Literature No. 3, the focal length at the long focal length extremity is 490 mm (which is long), however, the f-number is 6.25 (which is slow) at the long focal length extremity, and a large amount of axial chromatic aberration occurs at the long focal length extremity, thereby deteriorating the optical quality. Furthermore, in the zoom lens system of Patent Literature No. 3, the second lens group is stationary relative to the image plane during zooming, however, since the diaphragm is moved as an independent group in the optical axis direction, this results in five independent groups being moved in the optical axis direction, and the entire mechanism, including the zooming mechanism, becoming large, having an increased weight and increased complexity. Furthermore, although the zoom lens system of Patent Literature No. 3 utilizes a front-focusing method, in which the first lens group is moved in the optical axis direction during focusing, since the diameter and weight of the first lens group are large, this zoom lens system is not suitable for autofocusing.

Patent Literature No. 4 discloses a zoom lens system having five lens groups, i.e., a positive lens group, a negative lens group, a positive lens group, a positive lens group, and a negative lens group. Although the zoom lens system in Patent Literature No. 4 has a focal length of 485 mm (which is long) at the long focal length extremity and the f-number is 5.8 (which is somewhat fast), a large amount of chromatic aberration occurs at the long focal length extremity, thereby deteriorating the optical quality. Furthermore, although the zoom lens system of the Patent Literature No. 4 utilizes a rear-focusing method, in which the fifth lens group is moved in the optical axis direction during focusing, large amounts of spherical aberration and field curvature occur, thereby deteriorating the optical quality.

CITATION LIST

Patent Literature

Patent Literature No. 1: Japanese Patent No. 4,227,223
Patent Literature No. 2: Japanese Unexamined Patent Publication No. 2009-168933
Patent Literature No. 3: Japanese Patent No. 4,115,746
Patent Literature No. 4: Japanese Unexamined Patent Publication No. 2011-17912

SUMMARY OF INVENTION

Technical Problem

The present invention has been devised in view of the above-described problems, and an object of the present invention is to provide a zoom lens system which has a fast f-number, and favorably corrects various aberrations so that a superior optical quality is achieved.

Solution to Problem

A zoom lens system of the present invention is provided, including a positive first lens group, a negative second lens group, a third lens group which includes at least one positive lens element or one negative lens element, a positive fourth lens group, and a negative fifth lens group, in that order from the object side. At least the first lens group, the second lens group, the fourth lens group and the fifth lens group are moved during zooming from the short focal length extremity to the long focal length extremity, and the following conditions (1) and (2) are satisfied:

$$-6.5<f1/f5<-4.6 \quad (1),$$

and $$-1.2<fw/f3<0.7 \quad (2),$$

wherein f1 designates the focal length of the first lens group, f3 designates the focal length of the third lens group, f5 designates the focal length of the fifth lens group, and fw designates the focal length of the entire zoom lens system at the short focal length extremity.

The third lens group can have a positive or negative refractive power, or can have a substantive refractive power (a combined refractive power of the entire third lens group which includes at least one positive lens element or one negative lens element) of zero.

It is desirable for the following condition (1') to be satisfied within the scope of condition (1):

$$-6.0<f1/f5<-4.6 \quad (1').$$

It is desirable for the following condition (2') to be satisfied within the scope of condition (2):

$$-1.0<fw/f3<0.5 \quad (2').$$

It is desirable for the third lens group to include a positive lens element, a negative lens element, and a positive lens element or a positive cemented lens, in that order from the object side, wherein the following conditions (3) and (4) are satisfied:

$$0.75<f33/f31<2.4 \quad (3),$$

and $$-4.5<f33/f32<-1.9 \quad (4),$$

wherein f31 designates the focal length of the positive lens element that is provided closest to the object side within the third lens group, f32 designates the focal length of the second lens element, which is a negative lens element, provided closest to the object side within the third lens group, and f33 designates the focal length of the positive lens element or the positive cemented lens that is provided closest to the image side within the third lens group.

It is desirable for the following condition (3') to be satisfied within the scope of condition (3):

$$1.0<f33/f31<2.4 \quad (3)'.$$

It is desirable for the following condition (4') to be satisfied within the scope of condition (4):

$$-4.2<f33/f32<-2.0 \quad (4').$$

It is desirable for the third lens group to be stationary (does not move in the optical axis direction) relative to an imaging surface during zooming from the short focal length extremity to the long focal length extremity.

In the zoom lens system of the present invention, it is desirable for the first lens group to include one negative lens element and two or more positive lens elements, and for the following conditions (5) and (6) to be satisfied:

$$33<vd1n<45 \quad (5),$$

and $$77<vd1p \quad (6),$$

wherein vd1n designates the Abbe number with respect to the d-line of the negative lens element provided within the first lens group, and vd1p designates the average Abbe number with respect to the d-line of two or more positive lens elements provided within the first lens group.

In the zoom lens system of the present invention, it is desirable for, during focusing on an object at infinity to an object at a close distance, the fifth lens group to serve as a focusing lens group which moves in the optical axis direction. The fifth lens group, which is the focusing lens group, comprises a negative lens element, a cemented lens, and a negative lens element, in that order from the object side, and the following condition (7) is satisfied:

$$0.15<|d53/f5|<0.45 \quad (7),$$

wherein d53 designates the axial distance from the cemented lens to the negative lens element that is closest to the image side within the fifth lens group (the air-distance from the surface on the image side of the cemented lens provided in the fifth lens group to the surface on the object side of the negative lens element that is provided closest to the image side), and f5 designates the focal length of the fifth lens group.

In the zoom lens system of the present invention, it is desirable for the cemented lens provided in the fifth lens group to include a positive lens element and a negative lens element, wherein conditions (8) and (9) are satisfied:

$$vd5n>72 \quad (8),$$

and $$\theta gF5n>-0.0017*vd5n+0.655 \quad (9),$$

wherein vd5n designates the Abbe number with respect to the d-line of the negative lens element of the cemented lens provided within the fifth lens group, and θgF5n designates the partial dispersion ratio of the negative lens element of the cemented lens provided within the fifth lens group.

In the zoom lens system of the present invention, it is desirable for the second lens group to include a cemented lens having a positive lens element having a convex surface on the object side and a negative lens element having a concave surface on the image side, in that order from the object side, wherein the following condition (10) is satisfied:

$$vd21<vd22 \quad (10),$$

wherein vd21 designates the Abbe number with respect to the d-line of the positive lens element of the cemented lens provided within the second lens group, and vd22 designates the Abbe number with respect to the d-line of the negative lens element of the cemented lens provided within the second lens group.

In the zoom lens system of the present invention, it is desirable for the following condition (11) to be satisfied:

$$nd21<nd22 \quad (11),$$

wherein nd21 designates the refractive index at the d-line of the positive lens element of the cemented lens provided within the second lens group, and nd22 designates the refractive index at the d-line of the negative lens element of the cemented lens provided within the second lens group.

In the zoom lens system of the present invention, it is desirable for the following condition (12) to be satisfied:

$$\theta gF22 < -0.0016 * vd22 + 0.637 \quad (12),$$

wherein vd22 designates the Abbe number with respect to the d-line of the negative lens element of the cemented lens provided within the second lens group, and θgF22 designates the partial dispersion ratio of the negative lens element of the cemented lens provided within the second lens group.

Alternatively, the second lens group can include a negative lens element and a cemented lens, in that order from the object side, wherein the cemented lens provided on the image side includes a negative lens element and a positive Lens element.

In the zoom lens system of the present invention, it is desirable for the following condition (13) to be satisfied:

$$-2.3 < f1/f2 < -1.1 \quad (13),$$

wherein
f1 designates the focal length of the first lens group, and
f2 designates the focal length of the second lens group.

In another embodiment of the zoom lens system of the present invention, a positive first lens group, a negative second lens group, a positive or negative third lens group, a positive fourth lens group, and a negative fifth lens group, in that order from the object side. At least the first lens group, the second lens group, the fourth lens group and the fifth lens group are moved during zooming from the short focal length extremity to the long focal length extremity, and the following conditions (1) and (2) are satisfied:

$$-6.5 < f1/f5 < -4.6 \quad (1),$$

and $$-1.2 < fw/f3 < 0.7 (fw/f3 \neq 0) \quad (2),$$

wherein f1 designates the focal length of the first lens group, f3 designates the focal length of the third lens group, f5 designates the focal length of the fifth lens group, and fw designates the focal length of the entire zoom lens system at the short focal length extremity.

In another embodiment of the zoom lens system of the present invention, a positive first lens group, a negative second lens group, a positive third lens group, a positive fourth lens group, and a negative fifth lens group, in that order from the object side. At least the first lens group, the second lens group, the fourth lens group and the fifth lens group are moved during zooming from the short focal length extremity to the long focal length extremity, and the following conditions (1) and (2-1) are satisfied:

$$-6.5 < f1/f5 < -4.6 \quad (1),$$

and $$0 < fw/f3 < 0.7 \quad (2-1),$$

wherein f1 designates the focal length of the first lens group, f3 designates the focal length of the third lens group, f5 designates the focal length of the fifth lens group, and fw designates the focal length of the entire zoom lens system at the short focal length extremity.

In another embodiment of the zoom lens system of the present invention, a positive first lens group, a negative second lens group, a negative third lens group, a positive fourth lens group, and a negative fifth lens group, in that order from the object side. At least the first lens group, the second lens group, the fourth lens group and the fifth lens group are moved during zooming from the short focal length extremity to the long focal length extremity, and the following conditions (1) and (2-2) are satisfied:

$$-6.5 < f1/f5 < -4.6 \quad (1),$$

and $$-1.2 < fw/f3 < 0 \quad (2-2),$$

wherein f1 designates the focal length of the first lens group, f3 designates the focal length of the third lens group, f5 designates the focal length of the fifth lens group, and fw designates the focal length of the entire zoom lens system at the short focal length extremity.

Advantageous Effects of Invention

According to the present invention, a zoom lens system is provided, which has a fast f-number and favorably corrects various aberrations so that a superior optical quality is achieved.

BRIEF DESCRIPTION OF DRAWINGS

FIG. 1 is a lens arrangement of a first numerical embodiment of the zoom lens system, according to the present invention, when focused on an object at infinity at the short focal length extremity.

FIGS. 2A, 2B, 2C, 2D and 2E show various aberrations that occurred in the lens arrangement of FIG. 1.

FIGS. 3A, 3B and 3C show lateral aberrations that occurred in the lens arrangement of FIG. 1.

FIG. 4 is a lens arrangement of the first numerical embodiment when focused on an object at infinity at the long focal length extremity.

FIGS. 5A, 5B, 5C, 5D and 5E show various aberrations that occurred in the lens arrangement of FIG. 4.

FIGS. 6A, 6B and 6C show lateral aberrations that occurred in the lens arrangement of FIG. 4.

FIGS. 8A, 8B, 8C, 8D and 8E show various aberrations that occurred in the lens arrangement of FIG. 7.

FIGS. 9A, 9B and 9C show lateral aberrations that occurred in the lens arrangement of FIG. 7.

FIGS. 14A, 14B, 14C, 14D and 14E show various aberrations that occurred in the lens arrangement of FIG. 13.

FIGS. 15A, 15B and 15C show lateral aberrations that occurred in the lens arrangement of FIG. 13.

FIGS. 26A, 26B, 26C, 26D and 26E show various aberrations that occurred in the lens arrangement of FIG. 25.

FIGS. 27A, 27B and 27C show lateral aberrations that occurred in the lens arrangement of FIG. 25.

FIGS. 29A, 29B, 29C, 29D and 29E show various aberrations that occurred in the lens arrangement of FIG. 28.

FIGS. 30A, 30B and 30C show lateral aberrations that occurred in the lens arrangement of FIG. 28.

FIG. 31 is a lens arrangement of a sixth numerical embodiment of the zoom lens system, according to the present invention, when focused on an object at infinity at the short focal length extremity.

FIGS. 35A, 35B, 35C, 35D and 35E show various aberrations that occurred in the lens arrangement of FIG. 34.

FIGS. 36A, 36B and 36C show lateral aberrations that occurred in the lens arrangement of FIG. 34.

DESCRIPTION OF EMBODIMENTS

Figure 43:
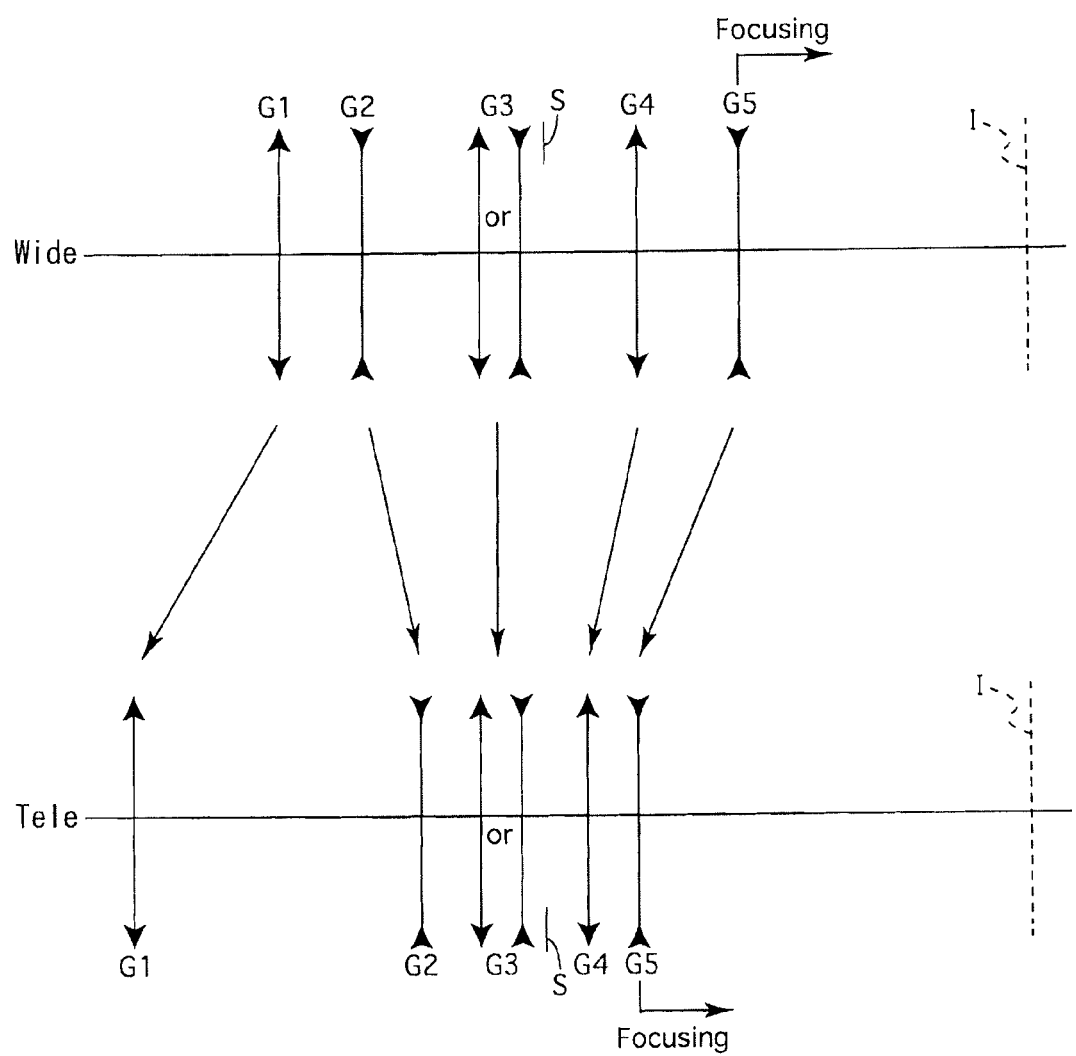
FIG. 43 shows a simplified movement diagram of the zoom lens system, according to the present invention.

In each of the first through seventh numerical embodiments, the zoom lens system of the present invention, as shown in the simplified movement diagram of FIG. 43, includes a positive first lens group G1, a negative second lens group G2, a positive or negative third lens group G3, a positive fourth lens group G4, and a negative fifth lens group G5 (a five-lens-group zoom lens system having either a positive/negative/negative/positive/negative lens group arrangement or a positive/negative/positive/positive/negative lens group arrangement), in that order from the object side. A diaphragm S is positioned in between the third lens group G3 and the fourth lens group G4 (immediately behind the third lens group G3). 'I' designates an imaging surface (image sensor surface).

In the zoom lens system of the present invention of each of the first through seventh numerical embodiments, as shown in the simplified movement diagram of FIG. 43, upon zooming from the short focal length extremity (Wide) to the long focal length extremity (Tele), the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 decreases.

Upon zooming from the short focal length extremity to the long focal length extremity, the first lens group G1, the fourth lens group G4 and the fifth lens group G5 monotonically move (extend) toward the object side. The amount of movement (amount of extension) of the first lens group G1 is the greatest, the amount of movement (amount of extension) of the fifth lens group G5 is the second greatest, and the amount of movement (amount of extension) of the fourth lens group G4 is the least.

The second lens group G2, during zooming from the short focal length extremity to the long focal length extremity, monotonically moves toward the image side.

The third lens group G3, during zooming from the short focal length extremity to the long focal length extremity, is stationary (does not move in the optical-axis direction) relative to the imaging surface I, together with the diaphragm that is provided immediately behind the third lens group G3.

Each of the first through seventh numerical embodiments of the zoom lens system of the present invention, as shown in the simplified movement diagram of FIG. 43, employs a rear-focusing method in which, upon focusing on an object at infinity through to an object at a finite distance, the negative fifth lens group G5 positioned closest to the image side is moved toward the image side.

In each of the first through seventh numerical embodiments, the first lens group G1 is configured of a negative lens element 11, a positive lens element 12 and a positive lens element 13, in that order from the object side. The negative lens element 11 and the positive lens element 12 are not cemented to each other in the first, second and seventh numerical embodiments, and are cemented in the third through sixth numerical embodiments.

In each of the first through sixth numerical embodiments, the second lens group G2 is configured of a cemented lens having a positive lens element (a positive lens element having a convex surface on the object side) 21 and a negative lens element (a negative lens element having a concave surface on the image side) 22, in that order from the object side.

In the seventh numerical embodiment, the second lens group G2 is configured of a negative lens element 21', a negative lens element 22' and a positive lens element 23', in that order from the object side. The negative lens element 22' and the positive lens element 23' are cemented to each other.

In each of the first through fourth numerical embodiments, the third lens group G3 is configured of a positive lens element 31, a negative lens element 32, a positive lens element 33 and a negative lens element 34, in that order from the object side. The positive lens element 33 and the negative lens element 34 are cemented to each other, and this cemented lens possesses a positive refractive power.

In each of the fifth through seventh numerical embodiments, the third lens group G3 is configured of a positive lens element 31', a negative lens element 32' and a positive lens element 33', in that order from the object side.

In each of the first through seventh numerical embodiments, the fourth lens group G4 is configured of a negative lens element 41, a positive lens element 92, a positive lens element 43, a negative lens element 44, and a positive lens element 45, in that order from the object side. The positive lens element 43 and the negative lens element 44 are cemented to each other.

In each of the first through seventh numerical embodiments, the fifth lens group G5 is configured of a negative lens element 51, a positive lens element 52, a negative lens element 53, and a negative lens element 54, in that order from the object side. The positive lens element 52 and the negative lens element 53 are cemented to each other.

The zoom lens system in the embodiments is a telephoto five-lens-group zoom lens system of either a positive/negative/negative/positive/negative lens group arrangement or a positive/negative/positive/positive/negative lens group arrangement, which successfully covers an ultra telescopic range exceeding a focal length of 400 mm (exceeds a focal length of 400 mm at the long focal length extremity) and achieves an f-number at the long focal length extremity which is faster than 6.

Furthermore, in the zoom lens system of the embodiments, a rear-focusing method, in which the negative fifth lens group G5 provided closest to the image side is moved toward the image side, is employed as a focusing method in order to advantageously carry out autofocusing.

Furthermore, in the zoom lens system of the embodiments, by setting the positive or negative refractive power of the third lens group G3 to a minimum and configuring the third lens group G3 to be stationary, together with the diaphragm S, relative to the imaging surface I during zooming, the number of lens groups that are moved (movable lens groups) during zooming are reduced, thereby achieving miniaturization, a reduction in weight and simplification of the entire mechanism, including the zooming mechanism.

Furthermore, in the zoom lens system of the embodiments, by appropriately determining the power balance of the lens groups, including the first lens group G1, the third lens group G3 and the fifth lens group G5, the various aberrations can be favorably corrected to achieve a superior optical quality, and the overall length of the lens system can be shortened.

Condition (1) and (1') specifies the ratio of the focal length of the first lens group G1 to the focal length of the fifth lens group G5. By satisfying condition (1), various aberrations can be favorably corrected and aberration fluctuations, during focusing can be suppressed, at the long focal length extremity in particular, to achieve a superior optical quality while the entire length of the lens system can be shortened. This effect can be more prominently achieved by satisfying condition (1').

If the upper limit of condition (1) or (1') is exceeded, the positive refractive power of the first lens group G1 becomes too strong, so that large amounts of spherical aberration and axial chromatic aberration occur at the long focal length extremity. Furthermore, the negative refractive power of the fifth lens group G5 becomes too weak, so that the focusing movement amount of the fifth lens group G5 (which constitutes a focusing lens group) becomes too large, thereby causing the overall length of the lens system to increase.

If lower limit of condition (1) is exceeded, the negative refractive power of the fifth lens group G5 becomes too strong, so that a large amount of distortion occurs, and a large amount of aberration fluctuation occurs during focusing. Furthermore, the positive refractive power of the first lens group G1 becomes too weak, so that the overall length of the lens system increases, especially at the long focal length extremity.

Conditions (2) and (2') specify the ratio of the focal length of the entire lens system at the short focal length extremity to the focal length of the third lens group G3. By satisfying condition (2), coma and astigmatism at the long focal length extremity and spherical aberration can be favorably corrected over the entire zooming range, thereby achieving a superior optical quality. This effect can be more prominently achieved by satisfying condition (2').

If the upper limit of condition (2) is exceeded, the positive optical power of the third lens group G3 becomes too strong, so that a large amount of spherical aberration occurs in the third lens group G3 over the entire zooming range.

If the lower limit of condition (2) is exceeded, the negative refractive power of the third lens group G3 becomes too strong, so that since the positive refractive powers of the first lens group G1 and the fourth lens group G4 need to be increased, large amounts of coma and astigmatism occur at the long focal length extremity.

Conditions (1) and (2) do not necessarily need to be satisfied at the same time (these conditions are not integrally inseparable), a certain degree of effect can be obtained even in a zoom lens system in which only one of conditions (1) and (2) is satisfied, and is included within the technical scope of the zoom lens system according to the present invention.

As described above, in each of the first through seventh numerical embodiments, the third lens group G3 is configured of the positive lens element (31 or 31'), the negative lens element (32 or 32'), and the positive lens element (33') or the positive cemented lens (33 and 34), in that order from the object side. According to this configuration, even if an incident light bundle has a weak divergence or convergence from the second lens group G2 to the third lens group G3, correction of aberrations can be favorably carried out.

With the third lens group G3 having the above-described configuration, condition (3) specifies the ratio of the focal length of the positive lens element (31 or 31') that is provided closest to the object side within the third lens group G3 to the focal length of the positive lens element (33') provided closest to the image side within the third lens group G3 or the positive cemented lens (33 and 34) provided within the third lens group G3. By satisfying condition (3), spherical aberration and coma can be favorably corrected, thereby achieving a superior optical quality. This effect can be more prominently achieved by satisfying condition (3').

If the upper limit of condition (3) or (3') is exceeded, the positive refractive power of the positive lens element (31 or 31') provided closest to the object side within the third lens group G3 becomes too strong, so that a large amount of spherical aberration occurs.

If the lower limit of condition (3) is exceeded, the positive refractive power of the positive lens element (33') provided closest to the image side within the third lens group G3 or the positive refractive power of the positive cemented lens (33 and 34) provided within the third lens group G3 becomes too strong, so that a large amount of spherical aberration and coma occur.

With the third lens group G3 having the above-described configuration, condition (4) specifies the ratio of the focal length of the second lens element, which is a negative lens element (32 or 32'), provided closest to the object side within the third lens group G3 to the focal length of the positive lens element (33') provided closest to the image side within the third lens group G3 or the positive cemented lens (33 and 34) provided within the third lens group G3. By satisfying condition (4), spherical aberration can be favorably corrected, thereby achieving a superior optical quality. This effect can be more prominently achieved by satisfying condition (4').

If the upper limit of condition (4) is exceeded, the negative refractive power of the second negative lens element (32 or 32'), closest to the object side, within the third lens group G3 becomes too weak, so that the correction of spherical aberration becomes insufficient.

If the lower limit of condition (4) is exceeded, the negative refractive power of the second negative lens element (32 or 32'), closest to the object side, within the third lens group G3 becomes too strong, so that the correction of spherical aberration becomes excessive.

As described above, in each of the first through seventh numerical embodiments, the first lens group G1 is configured from one negative lens element 11 and two positive lens elements 12 and 13. Accordingly, spherical aberration and axial chromatic aberration at the long focal length extremity can be favorably corrected. Furthermore, an additional positive lens element(s) can be added to the first lens group G1 so that the first lens group G1 includes three or more positive lens elements.

With the first lens group G1 having the above-described configuration, condition (5) specifies the Abbe number with respect to the d-line of the negative lens element 11 provided within the first lens group G1. By satisfying condition (5), lateral chromatic aberration at the short focal length extremity and axial chromatic aberration at the long focal length extremity can be favorably corrected while suppressing the occurrence of a secondary spectrum at the g-line, thereby achieving a superior optical quality.

If the upper limit of condition (5) is exceeded, lateral chromatic aberration at the short focal length extremity and axial chromatic aberration at the long focal length extremity becomes insufficiently corrected.

If the lower limit of condition (5) is exceeded, since the partial dispersion ratio of the negative lens element 11 provided within the first lens group G1 becomes large, a large secondary spectrum at the g-line occurs. The partial dispersion ratio is expressed in the following equation:

$$\theta gF=(ng-nF)/(nF-nC),$$

wherein ng, nF and nC designate the refractive indexes at the g-line, the F-line and the C-line, respectively.

With the first lens group G1 having the above-described configuration, condition (6) specifies the average Abbe number with respect to the d-line of the two positive lens elements 12 and 13 provided within the first lens group G1 (in the case where three or more positive lens elements are included within the first lens group G1, the average Abbe number with respect to the d-line of these positive lens elements). By satisfying condition (6), the secondary spectrum of the axial chromatic aberration, at the long focal length extremity in particular, can be favorably corrected, thereby achieving a superior optical quality.

If the lower limit of condition (6) is exceeded, it becomes difficult to correct the secondary spectrum of the axial chromatic aberration, at the long focal length extremity in particular.

As described above, the fifth lens group G5 is a focusing lens group which moves in the optical axis direction, upon focusing on an object at infinity through to an object at a close distance; and this fifth lens group G5 (focusing lens group) is configured of a negative lens element 51, a cemented lens having a positive lens element 52 and a negative lens element 53; and a negative lens element 54, in that order from the object side. Hence, by selecting the fifth lens group G5, which has a small diameter and a low weight, miniaturization, a reduction in weight and simplification of the entire mechanism, including the focusing mechanism, can be achieved.

With the fifth lens group G5 having the above-described configuration, condition (7) specifies the ratio of the axial distance between the cemented lens (negative lens element 53) provided within the fifth lens group G5 and the negative lens element 54 which is positioned closest to the image side (the air-distance from the surface on the image side of the negative lens element 53 to the surface on the object side of the negative lens element 54 within the fifth lens group G5) to the focal length of the fifth lens group G5. By appropriately determining the distance from the cemented lens (negative lens element 53) to the negative lens element 54, provided within the fifth lens group G5, in order to satisfy condition (7), an adequate quantity of peripheral light rays can be collected at the long focal length extremity. Furthermore, since the refractive power of the individual lens elements can be weakened while maintaining the negative refractive power of the fifth lens group G5, fluctuations in spherical aberration, coma and astigmatism during focusing can be suppressed, thereby achieving a superior optical quality. In addition, positioning the rearmost lens surface as rearward as possible increases the exit angle of the abaxial light rays, and reduces shading, in which abaxial light rays are obscured by the mount components, especially at the long focal length extremity.

If the upper limit of condition (7) is exceeded, the distance from the cemented lens (negative lens element 53) to the negative lens element 54 within the fifth lens group G5 becomes too long, so that the refraction of the abaxial light rays at the negative lens element 54 becomes large, and a large amount of distortion occurs.

If the lower limit of condition (7) is exceeded, the refractive power of each individual lens element of the fifth lens group G5 becomes too strong, so that aberration fluctuations during focusing become large, and the peripheral light quantity at the long focal length extremity decreases.

With the fifth lens group G5 having the above-described configuration, conditions (8) and (9) specify the Abbe number and the partial dispersion ratio, respectively, with respect to the d-line of the negative lens element 53 of the cemented lens that is provided within the fifth lens group G5.

Generally, when lateral chromatic aberration with respect to the C-line and the F-line in a telephoto zoom lens system is corrected at the long focal length extremity, there is a tendency for the correction of lateral chromatic aberration with respect to the g-line to be insufficient. Consequently, in the zoom lens system of the present embodiments, by forming the negative lens element 53 of the cemented lens provided within the fifth lens group G5 with a material that satisfies conditions (8) and (9), the lateral chromatic aberration with respect to the g-line can be favorably corrected at the long focal length extremity.

If the lower limit of condition (8) is exceeded, correction of lateral chromatic aberration becomes difficult.

If the lower limit of condition (9) is exceeded, the effect of the correction of lateral chromatic aberration, with respect to the g-line at the long focal length extremity, becomes small.

As described above, in each of the first through sixth numerical embodiments, the second lens group G2 is configured of a cemented lens provided with a positive lens element 21 having a convex surface on the object side and a negative lens element 22 having a concave surface on the image side, in that order from the object side. By forming a convex surface on the object side of the surface that is closest to the object side within the second lens group G2 (the surface on the object side of the positive lens element 21), the refraction of the light rays, which are collected by the first lens group G1, can be reduced, and chromatic aberration can be effectively corrected by the cemented surface between the positive lens element 21 and the negative lens element 22, and the surface on the image side of the negative lens element 22.

With the second lens group G2 having the above-described configuration, conditions (10), (11) and (12) specify conditions for a material that the positive lens element 21 and the negative lens element 22, of the cemented lens provided within the second lens group G2, should satisfy. By satisfying conditions (10), (11) and (12), aberrations (especially axial chromatic aberration with respect to the g-line at the long focal length extremity) can be favorably corrected with the second lens group being configured of a small number of lens elements, i.e., the positive lens element 21 and the negative lens element 22, so that a superior optical quality can be achieved.

If conditions (10), (11) and (12) are not satisfied, it becomes difficult to correct aberrations (especially axial chromatic aberration with respect to the g-line at the long focal length extremity).

Condition (13) specifies the ratio of the focal length of the first lens group G1 to the focal length of the second lens group G2. By satisfying condition (13), axial chromatic aberration, lateral chromatic aberration and spherical aberration can be favorably corrected, thereby achieving a superior optical quality.

If the upper limit of condition (13) is exceeded, the negative refractive power of the second lens group G2 becomes too weak, so that the axial chromatic aberration at the long focal length extremity is insufficiently corrected.

If the lower limit of condition (13) is exceeded, the negative refractive power of the second lens group G2 becomes too strong, so that lateral chromatic aberration becomes overcorrected at the short focal length extremity. Furthermore, since the divergence of the incident light rays at the third lens group G3 becomes strong, the refractive power of the third lens group G3 becomes strong, so that a large amount of spherical aberration occurs.

[Embodiments]

Specific first through seventh numerical embodiments will be herein discussed. In the aberration diagrams, lateral aberration diagrams and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm). None of the first through seventh numerical embodiments utilize an aspherical lens element.

[Numerical Embodiment 1]

FIGS. 1 through 6C and Tables 1 through 3 show a first numerical embodiment of a zoom lens system according to the present invention. FIG. 1 is a lens arrangement of the zoom lens system when focused on an object at infinity at the short focal length extremity; FIGS. 2A, 2B, 2C, 2D and 2E show various aberrations that occurred therein; FIGS. 3A, 3B and 3C show lateral aberrations that occurred therein; FIG. 4 is a lens arrangement of the zoom lens system when focused on an object at infinity at the long focal length extremity; FIGS. 5A, 5B, 5C, 5D and 5E show various aberrations that occurred therein; and FIGS. 6A, 6B and 6C show lateral aberrations that occurred therein. Table 1 shows the lens data, Table 2 shows various data, and Table 3 shows lens-group data.

The zoom lens system of the first numerical embodiment is configured of a positive first lens group G1, a negative second lens group G2, a negative third lens group G3, a positive fourth lens group G4, and a negative fifth lens group G5, in that order from the object side. A diaphragm S is positioned in between the third lens group G3 and fourth lens group G4 (immediately behind the third lens group G3). Upon zooming from the short focal length extremity to the long focal length extremity, the diaphragm S is stationary (does not move in the optical axis direction), with the third lens group G3, relative to the imaging surface I.

The first lens group G1 is configured of a negative meniscus lens element 11 having a convex surface on the object side, a positive meniscus lens element 12 having a convex surface on the object side, and a biconvex positive lens element 13, in that order from the object side.

The second lens group G2 is configured of a cemented lens provided with a biconvex positive lens element 21 and a biconcave negative lens element 22, in that order from the object side.

The third lens group G3 is configured of a biconvex positive lens element 31, a biconcave negative lens element 32, a biconvex positive lens element 33, and a biconcave negative lens element 34, in that order from the object side. The biconvex positive lens element 33 and the biconcave negative lens element 34 are cemented to each other, and this cemented lens has a positive refractive power.

The fourth lens group G4 is configured of a negative meniscus lens element 41 having a convex surface on the object side, a biconvex positive lens element 42, a biconvex positive lens element 43, a negative meniscus lens element 44 having a convex surface on the image side, and a biconvex positive lens element 45, in that order from the object side. The biconvex positive lens element 43 and the negative meniscus lens element 44 are cemented to each other.

The fifth lens group G5 is configured of a negative meniscus lens element 51 having a convex surface on the object side, a biconvex positive lens element 52, a negative meniscus lens element 53 having a convex surface on the image side, and a biconcave negative lens element 54, in that order from the object side. The biconvex positive lens element 52 and the negative meniscus lens element 53 are cemented to each other.

TABLE 1

SURFACE DATA

| Surf. No. | R | d | N (d) | ν (d) |
|---|---|---|---|---|
| 1 | 316.957 | 2.966 | 1.74950 | 35.3 |
| 2 | 135.722 | 0.450 | | |
| 3 | 145.847 | 8.089 | 1.49700 | 81.6 |
| 4 | 1973.988 | 0.100 | | |
| 5 | 159.562 | 8.683 | 1.53775 | 74.7 |
| 6 | −1106.779 | d6 | | |
| 7 | 93.601 | 4.547 | 1.71736 | 29.5 |
| 8 | −594.280 | 1.600 | 1.78590 | 44.2 |
| 9 | 57.359 | d9 | | |
| 10 | 79.178 | 6.050 | 1.51633 | 64.1 |
| 11 | −3090.887 | 1.775 | | |
| 12 | −86.700 | 1.450 | 1.80610 | 40.9 |
| 13 | 261.975 | 1.750 | | |
| 14 | 51.537 | 7.015 | 1.63980 | 34.5 |
| 15 | −92.009 | 1.563 | 1.75700 | 47.8 |
| 16 | 84.591 | 4.700 | | |
| 17 (diaphragm) | ∞ | d17 | | |
| 18 | 303.474 | 1.703 | 1.71736 | 29.5 |
| 19 | 88.857 | 0.700 | | |
| 20 | 136.264 | 6.071 | 1.61800 | 63.4 |
| 21 | −78.404 | 0.885 | | |
| 22 | 504.407 | 7.164 | 1.58913 | 61.2 |
| 23 | −38.141 | 1.400 | 1.74950 | 35.3 |
| 24 | −304.892 | 0.100 | | |
| 25 | 85.399 | 6.254 | 1.65844 | 50.9 |
| 26 | −209.169 | d26 | | |
| 27 | 195.066 | 1.300 | 1.83481 | 42.7 |
| 28 | 54.584 | 2.158 | | |
| 29 | 1009.436 | 4.614 | 1.71736 | 29.5 |
| 30 | −45.585 | 1.684 | 1.49700 | 81.6 |
| 31 | −122.906 | 14.518 | | |
| 32 | −52.996 | 1.300 | 1.80400 | 46.6 |
| 33 | 445.364 | — | | |

TABLE 2

VARIOUS LENS-SYSTEM DATA
ZOOM RATIO 2.87

| | Short Focal Length Extremity | Intermediate Focal Length | Long Focal Length Extremity |
|---|---|---|---|
| FNO. | 4.6 | 5.1 | 5.7 |
| f | 153.50 | 260.00 | 440.00 |
| W | 7.9 | 4.7 | 2.8 |
| Y | 21.64 | 21.64 | 21.64 |
| fB | 50.74 | 66.32 | 96.17 |
| L | 277.95 | 316.89 | 343.64 |
| d6 | 19.995 | 82.586 | 133.054 |
| d9 | 50.870 | 27.220 | 3.500 |
| d17 | 26.239 | 21.425 | 8.433 |
| d26 | 29.522 | 18.749 | 1.900 |

TABLE 3

LENS GROUP DATA

| Lens Group | 1st Surface | Focal Length |
|---|---|---|
| 1 | 1 | 260.16 |
| 2 | 7 | −173.02 |
| 3 | 10 | −363.61 |
| 4 | 18 | 60.52 |
| 5 | 27 | −52.48 |

[Numerical Embodiment 2]

Figure 7:
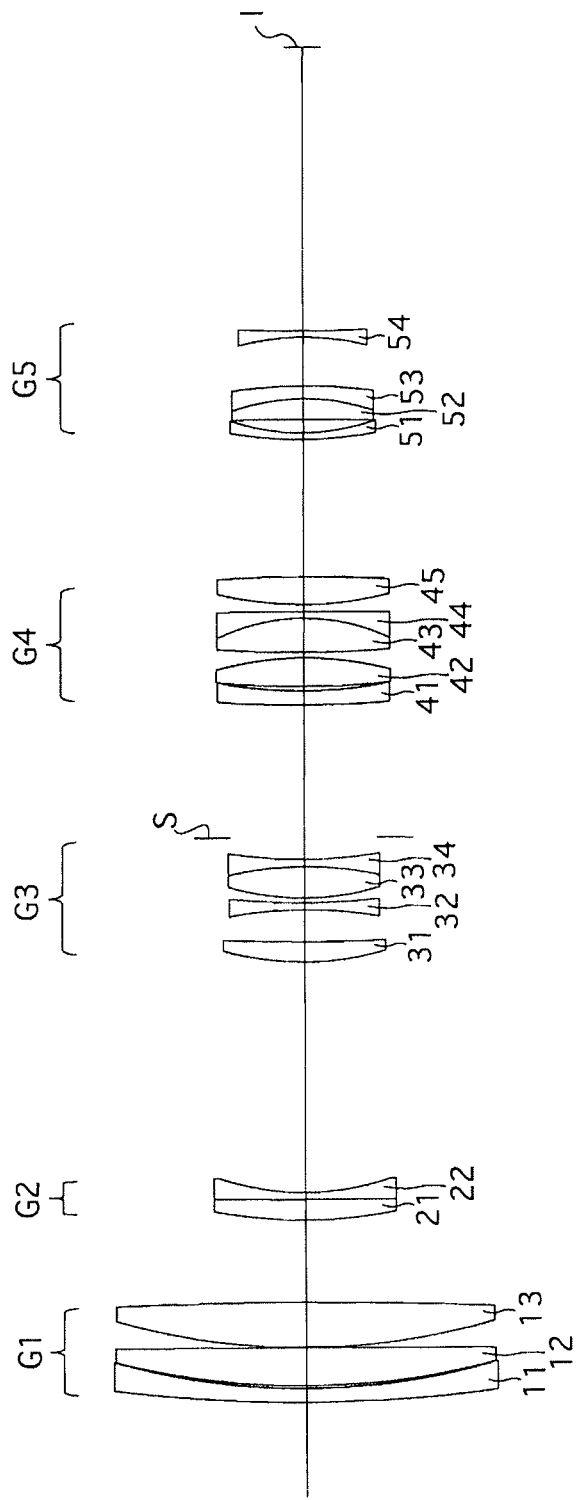
FIG. 7 is a lens arrangement of a second numerical embodiment of the zoom lens system, according to the present invention, when focused on an object at infinity at the short focal length extremity.
Figure 10:
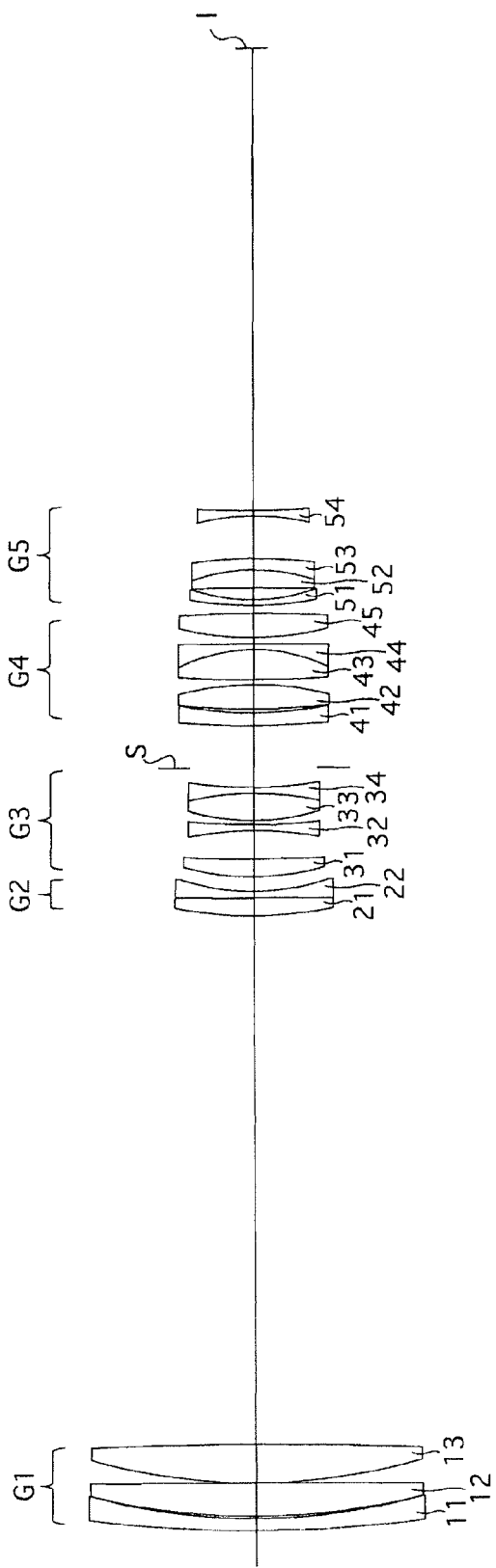
FIG. 10 is a lens arrangement of the second numerical embodiment when focused on an object at infinity at the long focal length extremity.
Figures 11A, 11B, 11C, 11D, 11E:
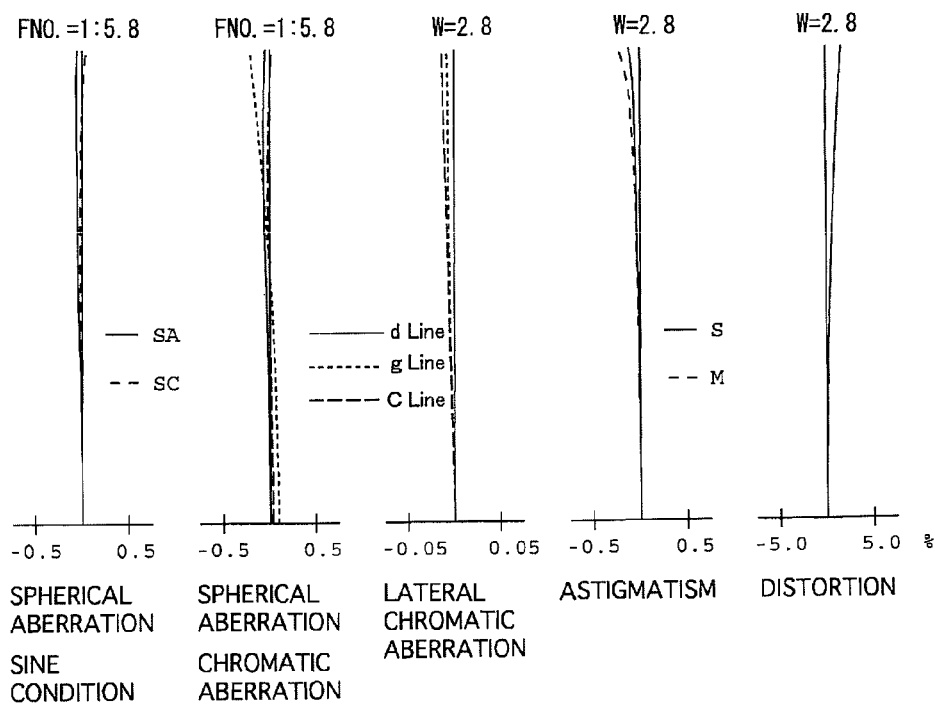
FIGS. 11A, 11B, 11C, 11D and 11E show various aberrations that occurred in the lens arrangement of FIG. 10.
Figure 12A:
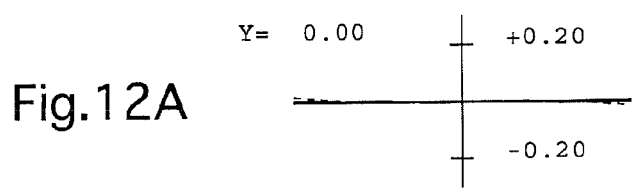
FIGS. 12A, 12B and 12C show lateral aberrations that occurred in the lens arrangement of FIG. 10.
Figure 12B:
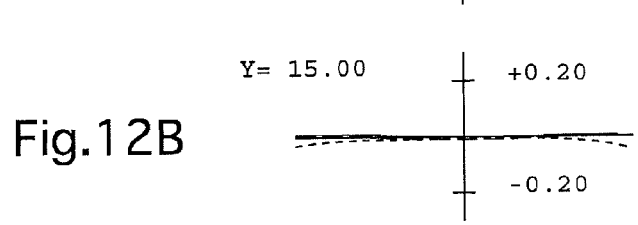
Figure 12C:
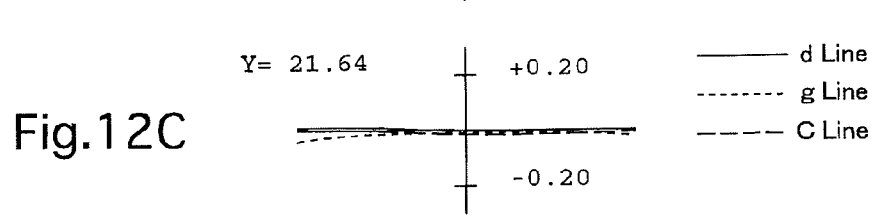

FIGS. 7 through 12C and Tables 4 through 6 show a second numerical embodiment of a zoom lens system according to the present invention. FIG. 7 is a lens arrangement of the zoom lens system when focused on an object at infinity at the short focal length extremity; FIGS. 8A, 8B, 8C, 8D and 8E show various aberrations that occurred therein; FIGS. 9A, 9B and 9C show lateral aberrations that occurred therein; FIG. 10 is a lens arrangement of the zoom lens system when focused on an object at infinity at the long focal length extremity; FIGS. 11A, 11B, 11C, 11D and 11E show various aberrations that occurred therein; and FIGS. 12A, 12B and 12C show lateral aberrations that occurred therein. Table 4 shows the lens data, Table 5 shows various data, and Table 6 shows lens-group data.

The lens arrangement of the second numerical embodiment differs from the lens arrangement of the first numerical embodiment with respect to the following features:

(1) The positive lens element 12 of the first lens group G1 is a biconvex positive lens element.

(2) The positive lens element 31 of the third lens group G3 is a positive meniscus lens element having a convex surface on the object side.

(3) The positive lens element 52 of the fifth lens group G5 is a positive meniscus lens element having a convex surface on the image side.

TABLE 4

SURFACE DATA

| Surf. No. | R | d | N (d) | ν (d) |
|---|---|---|---|---|
| 1 | 310.390 | 2.950 | 1.83400 | 37.2 |
| 2 | 145.172 | 0.570 | | |
| 3 | 160.068 | 8.076 | 1.53775 | 74.7 |
| 4 | −8439.222 | 0.100 | | |
| 5 | 142.551 | 9.427 | 1.43875 | 95.0 |
| 6 | −901.412 | d6 | | |
| 7 | 101.125 | 4.275 | 1.71736 | 29.5 |
| 8 | −9247.192 | 1.500 | 1.74320 | 49.3 |
| 9 | 56.027 | d9 | | |
| 10 | 62.448 | 4.191 | 1.51633 | 64.1 |
| 11 | 388.506 | 6.738 | | |
| 12 | −88.865 | 1.450 | 1.80610 | 40.9 |
| 13 | 153.831 | 1.000 | | |
| 14 | 55.341 | 6.499 | 1.62004 | 36.3 |
| 15 | −72.950 | 1.450 | 1.72000 | 50.2 |
| 16 | 105.744 | 4.600 | | |
| 17 (diaphragm) | ∞ | d17 | | |
| 18 | 220.617 | 2.960 | 1.71736 | 29.5 |
| 19 | 89.322 | 0.945 | | |
| 20 | 175.328 | 5.882 | 1.61800 | 63.4 |
| 21 | −71.346 | 1.188 | | |
| 22 | 267.876 | 7.104 | 1.58913 | 61.2 |
| 23 | −41.261 | 1.400 | 1.74950 | 35.3 |
| 24 | −960.443 | 1.512 | | |
| 25 | 75.092 | 5.760 | 1.65844 | 50.9 |
| 26 | −284.531 | d26 | | |
| 27 | 84.984 | 1.350 | 1.83481 | 42.7 |
| 28 | 45.254 | 2.819 | | |
| 29 | −826.005 | 4.320 | 1.74000 | 28.3 |

TABLE 4-continued

SURFACE DATA

| Surf. No. | R | d | N (d) | ν (d) |
|---|---|---|---|---|
| 30 | −45.833 | 2.699 | 1.53775 | 74.7 |
| 31 | −111.510 | 10.070 | | |
| 32 | −54.637 | 1.340 | 1.80400 | 46.6 |
| 33 | 276.354 | — | | |

TABLE 5

VARIOUS LENS-SYSTEM DATA
ZOOM RATIO 2.86

| | Short Focal Length Extremity | Intermediate Focal Length | Long Focal Length Extremity |
|---|---|---|---|
| FN0. | 4.6 | 5.1 | 5.8 |
| f | 153.69 | 259.97 | 439.00 |
| W | 7.9 | 4.7 | 2.8 |
| Y | 21.64 | 21.64 | 21.64 |
| fB | 56.92 | 72.30 | 101.08 |
| L | 280.38 | 318.90 | 345.52 |
| d6 | 17.258 | 78.372 | 126.698 |
| d9 | 47.792 | 25.201 | 3.500 |
| d17 | 27.613 | 22.563 | 10.176 |
| d26 | 28.616 | 18.291 | 1.900 |

TABLE 6

LENS GROUP DATA

| Lens Group | 1st Surface | Focal Length |
|---|---|---|
| 1 | 1 | 255.14 |
| 2 | 7 | −170.68 |
| 3 | 10 | −297.68 |
| 4 | 18 | 58.96 |
| 5 | 27 | −54.87 |

[Numerical Embodiment 3]

Figure 13:
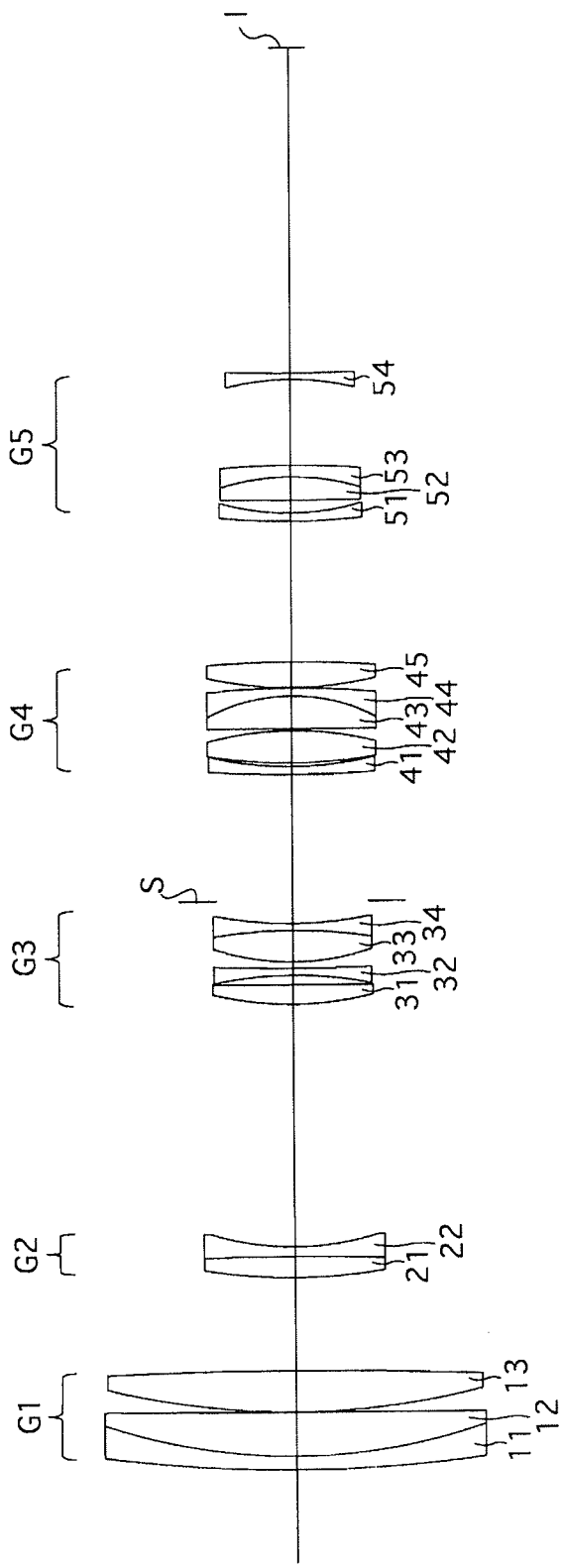
FIG. 13 is a lens arrangement of a third numerical embodiment of the zoom lens system, according to the present invention, when focused on an object at infinity at the short focal length extremity.
Figure 16:
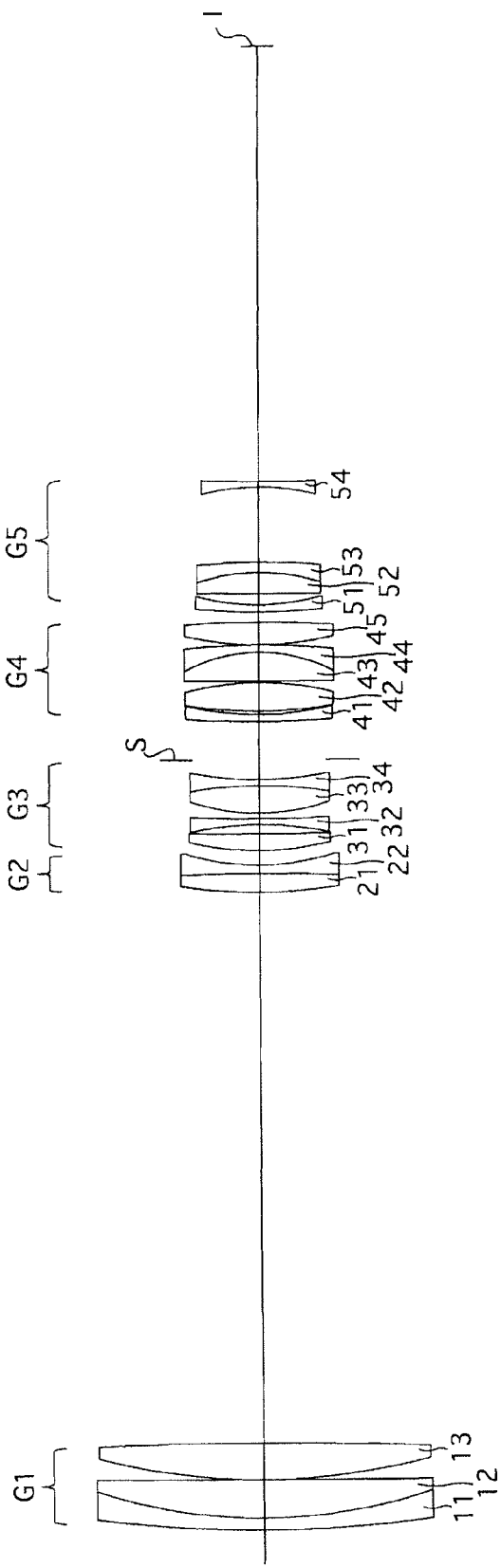
FIG. 16 is a lens arrangement of the third numerical embodiment when focused on an object at infinity at the long focal length extremity.
Figures 17A, 17B, 17C, 17D, 17E:
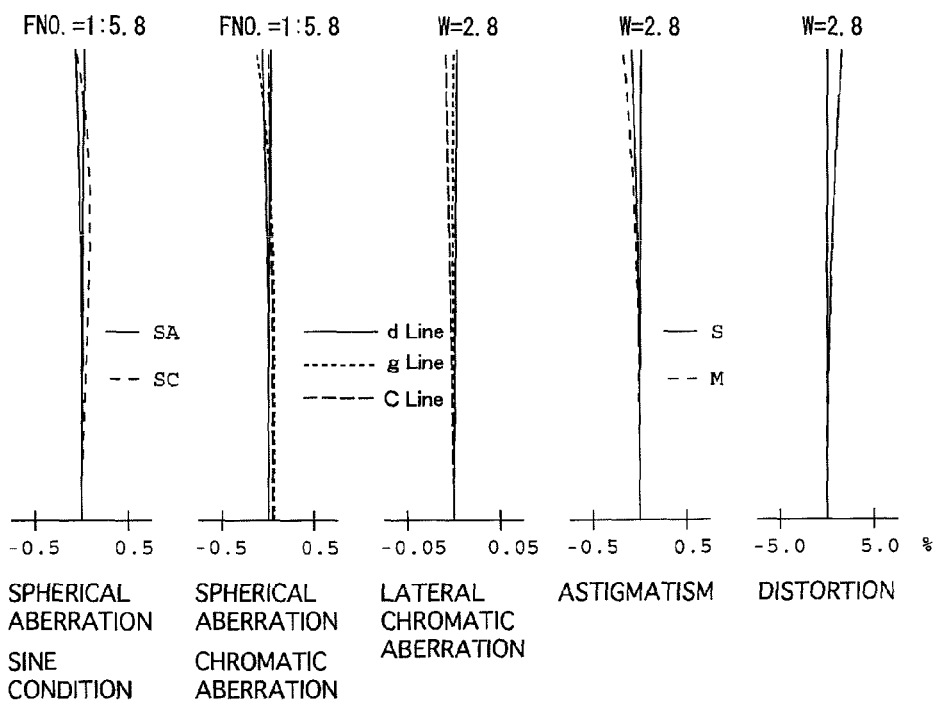
FIGS. 17A, 17B, 17C, 17D and 17E show various aberrations that occurred in the lens arrangement of FIG. 16.
Figure 18A:
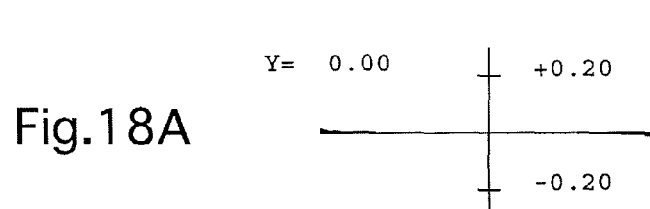
FIGS. 18A, 18B and 18C show lateral aberrations that occurred in the lens arrangement of FIG. 16.
Figure 18B:
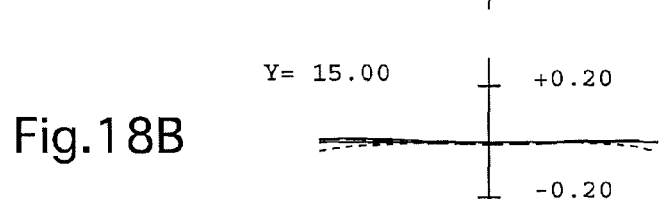
Figure 18C:
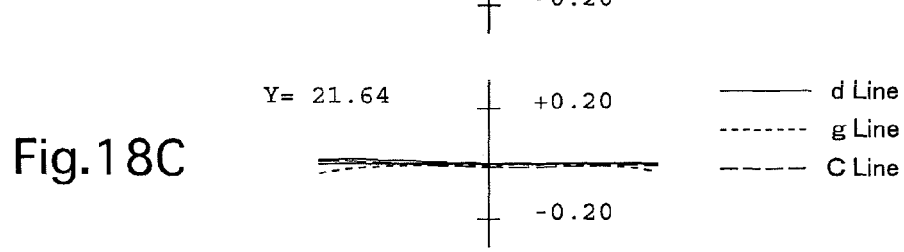

FIGS. 13 through 18C and Tables 7 through 9 show a third numerical embodiment of a zoom lens system according to the present invention. FIG. 13 is a lens arrangement of the zoom lens system when focused on an object at infinity at the short focal length extremity; FIGS. 14A, 14B, 14C, 14D and 14E show various aberrations that occurred therein; FIGS. 15A, 15B and 15C show lateral aberrations that occurred therein; FIG. 16 is a lens arrangement of the zoom lens system when focused on an object at infinity at the long focal length extremity; FIGS. 17A, 17B, 17C, 17D and 17E show various aberrations that occurred therein; and FIGS. 18A, 18B and 18C show lateral aberrations that occurred therein. Table 7 shows the lens data, Table 8 shows various data, and Table 9 shows lens-group data.

The lens arrangement of the third numerical embodiment differs from the lens arrangement of the first numerical embodiment with respect to the following features:

(1) The negative meniscus lens element 11 and the positive meniscus lens element 12 of the first lens group G1 are cemented to each other.

(2) The positive lens element 31 of the third lens group G3 is a positive meniscus lens element having a convex surface on the object side.

(3) The positive lens element 43 of the fourth lens group G4 is a planoconvex positive lens element having a convex surface on the image side.

TABLE 7

SURFACE DATA

| Surf. No. | R | d | N (d) | ν (d) |
|---|---|---|---|---|
| 1 | 291.258 | 2.950 | 1.80610 | 40.9 |
| 2 | 123.095 | 9.351 | 1.49700 | 81.6 |
| 3 | 4408.662 | 0.100 | | |
| 4 | 157.341 | 8.841 | 1.49700 | 81.6 |
| 5 | −947.739 | d5 | | |
| 6 | 118.821 | 4.451 | 1.71736 | 29.5 |
| 7 | −507.283 | 2.043 | 1.74320 | 49.3 |
| 8 | 59.367 | d8 | | |
| 9 | 73.165 | 4.011 | 1.51633 | 64.1 |
| 10 | 2511.173 | 2.025 | | |
| 11 | −80.697 | 1.450 | 1.80610 | 40.9 |
| 12 | 426.128 | 1.342 | | |
| 13 | 52.061 | 6.645 | 1.62004 | 36.3 |
| 14 | −106.304 | 1.451 | 1.72000 | 50.2 |
| 15 | 85.002 | 4.701 | | |
| 16 (diaphragm) | ∞ | d16 | | |
| 17 | 269.997 | 1.654 | 1.67270 | 32.1 |
| 18 | 74.694 | 0.783 | | |
| 19 | 110.334 | 6.810 | 1.48749 | 70.2 |
| 20 | −70.310 | 0.375 | | |
| 21 | ∞ | 6.836 | 1.58913 | 61.2 |
| 22 | −38.390 | 1.700 | 1.74950 | 35.3 |
| 23 | −177.815 | 0.100 | | |
| 24 | 78.842 | 5.420 | 1.65844 | 50.9 |
| 25 | −237.757 | d25 | | |
| 26 | 152.521 | 1.700 | 1.83481 | 42.7 |
| 27 | 55.040 | 2.697 | | |
| 28 | 1021.539 | 4.919 | 1.71736 | 29.5 |
| 29 | −50.116 | 2.454 | 1.49700 | 81.6 |
| 30 | −175.242 | 17.981 | | |
| 31 | −56.236 | 1.340 | 1.80400 | 46.6 |
| 32 | 385.602 | — | | |

TABLE 8

VARIOUS LENS-SYSTEM DATA
ZOOM RATIO 2.86

| | Short Focal Length Extremity | Intermediate Focal Length | Long Focal Length Extremity |
|---|---|---|---|
| FN0. | 4.6 | 5.1 | 5.8 |
| f | 153.70 | 260.00 | 439.50 |
| W | 7.9 | 4.7 | 2.8 |
| Y | 21.64 | 21.64 | 21.64 |
| fB | 50.73 | 66.08 | 95.33 |
| L | 281.48 | 320.87 | 346.58 |
| d5 | 19.474 | 81.850 | 132.020 |
| d8 | 50.941 | 27.957 | 3.504 |
| d16 | 26.674 | 21.769 | 9.197 |
| d25 | 29.526 | 19.075 | 2.398 |

TABLE 9

LENS GROUP DATA

| Lens Group | 1st Surface | Focal Length |
|---|---|---|
| 1 | 1 | 262.74 |
| 2 | 6 | −160.06 |
| 3 | 9 | −528.81 |
| 4 | 17 | 63.09 |
| 5 | 26 | −52.68 |

[Numerical Embodiment 4]

Figure 19:
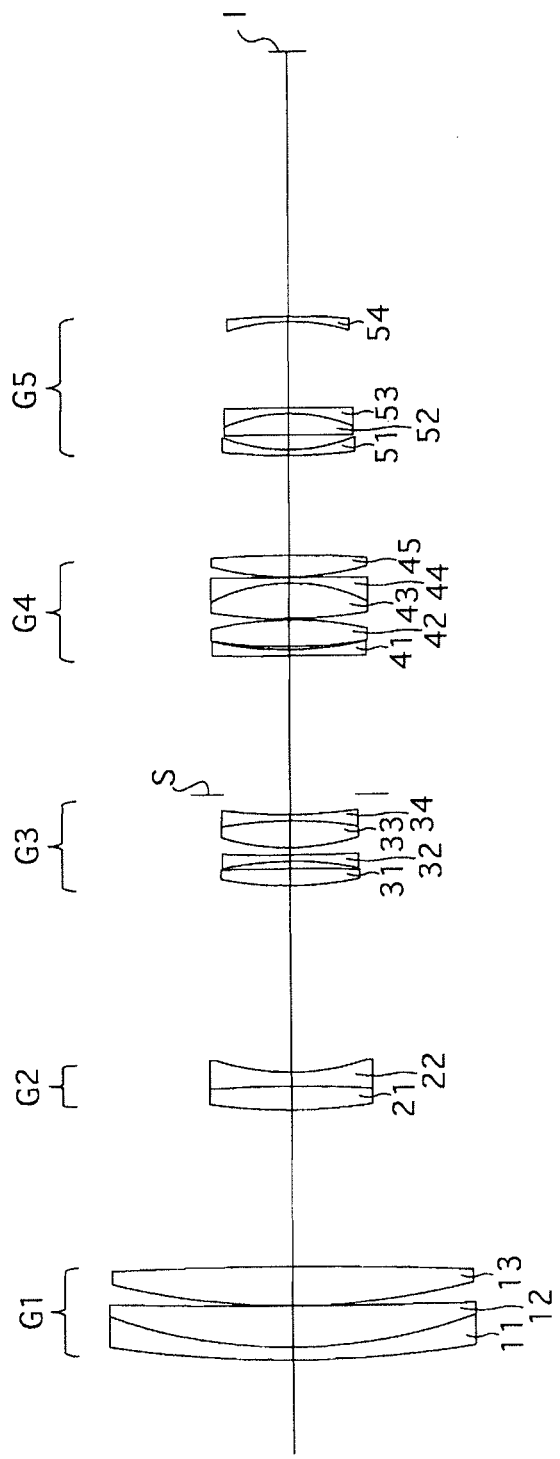
FIG. 19 is a lens arrangement of a fourth numerical embodiment of the zoom lens system, according to the present invention, when focused on an object at infinity at the short focal length extremity.
Figures 20A, 20B, 20C, 20D, 20E:
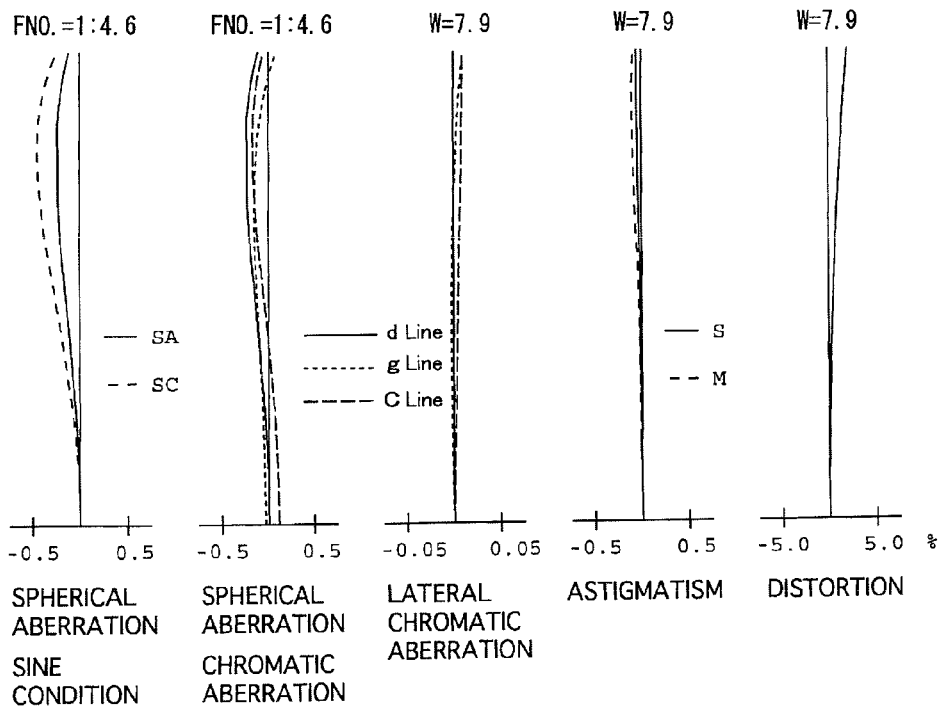
FIGS. 20A, 20B, 20C, 20D and 20E show various aberrations that occurred in the lens arrangement of FIG. 19.
Figure 21A:
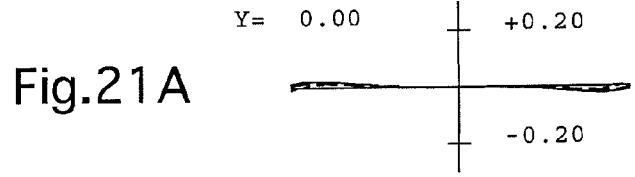
FIGS. 21A, 21B and 21C show lateral aberrations that occurred in the lens arrangement of FIG. 19.
Figure 21B:
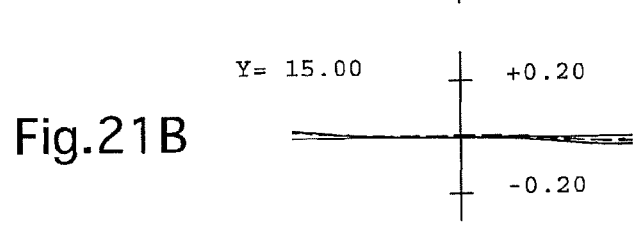
Figure 21C:
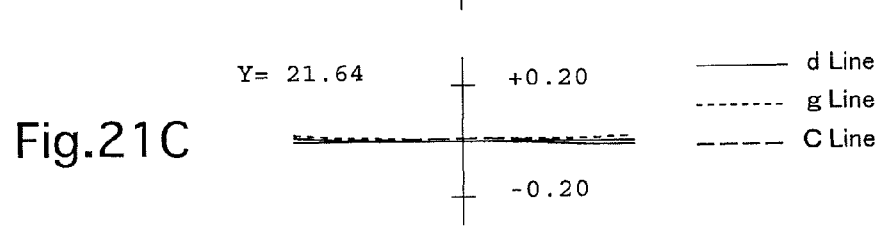
Figure 22:
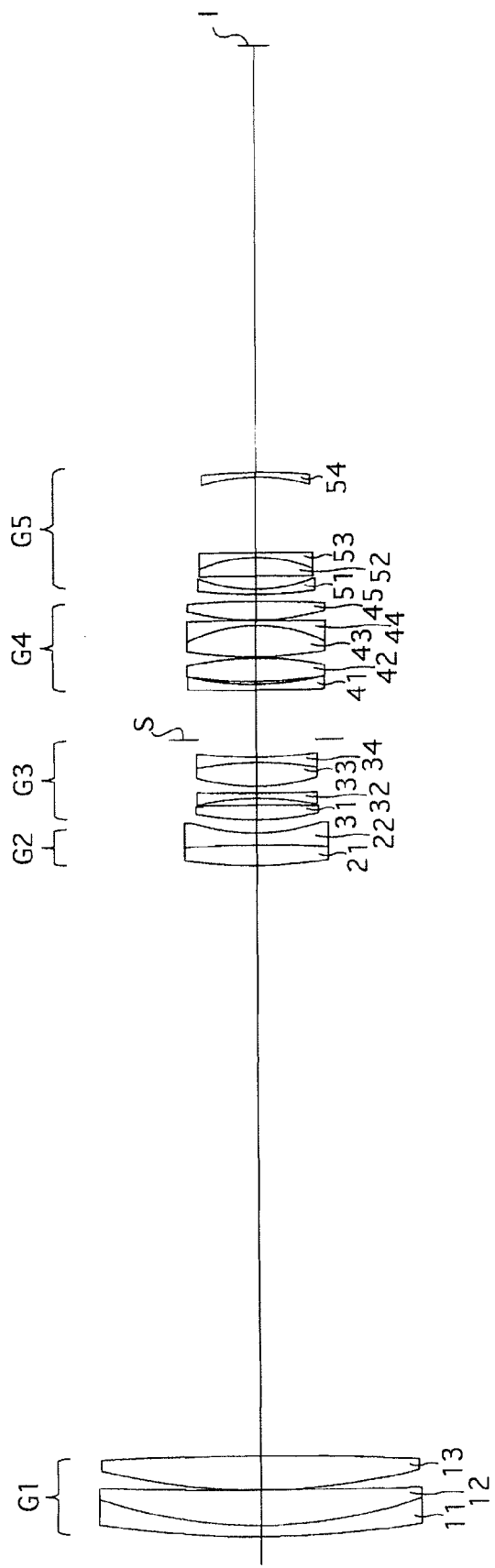
FIG. 22 is a lens arrangement of the fourth numerical embodiment when focused on an object at infinity at the long focal length extremity.
Figures 23A, 23B, 23C, 23D, 23E:
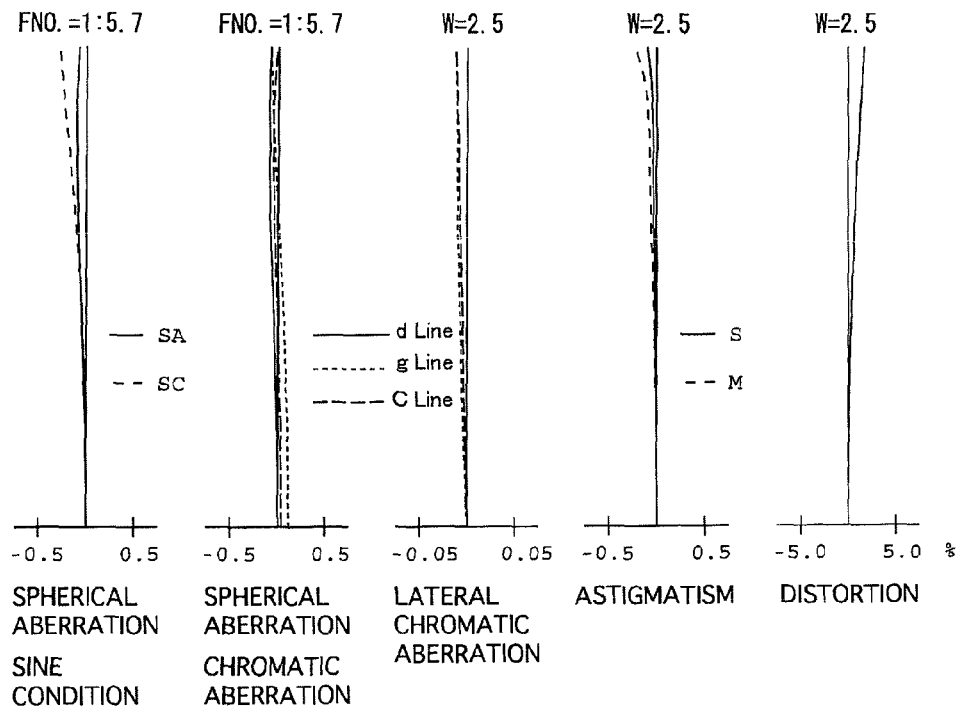
FIGS. 23A, 23B, 23C, 23D and 23E show various aberrations that occurred in the lens arrangement of FIG. 22.
Figure 24A:
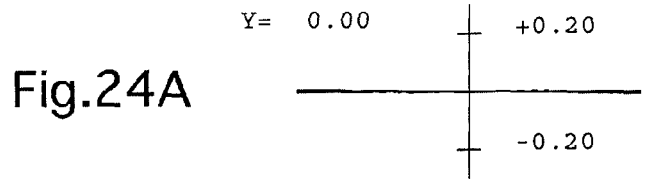
FIGS. 24A, 24B and 24C show lateral aberrations that occurred in the lens arrangement of FIG. 22.
Figure 24B:
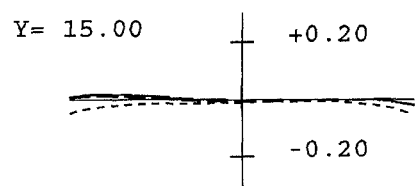
Figure 24C:
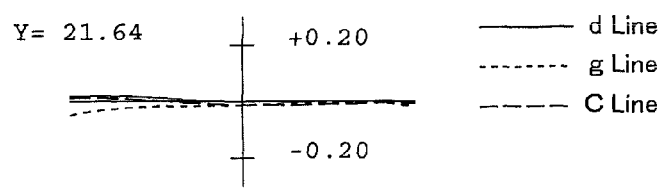

FIGS. 19 through 24C and Tables 10 through 12 show a fourth numerical embodiment of a zoom lens system according to the present invention. FIG. 19 is a lens arrangement of the zoom lens system when focused on an object at infinity at the short focal length extremity; FIGS. 20A, 20B, 20C, 20D and 20E show various aberrations that occurred therein; FIGS. 21A, 21B and 21C show lateral aberrations that occurred therein; FIG. 22 is a lens arrangement of the zoom lens system when focused on an object at infinity at the long focal length extremity; FIGS. 23A, 23B, 23C, 23D and 23E show various aberrations that occurred therein; and FIGS. 24A, 24B and 24C show lateral aberrations that occurred therein. Table 10 shows the lens data, Table 11 shows various data, and Table 12 shows lens-group data.

The lens arrangement of the fourth numerical embodiment differs from the lens arrangement of the first numerical embodiment with respect to the following features:

(1) The negative meniscus lens element 11 and the positive meniscus lens element 12 of the first lens group G1 are cemented to each other.

(2) In the fifth lens group G5, the positive lens element 52 is a positive meniscus lens element having a convex surface on the image side, the negative lens element 53 is a biconcave negative lens element, and the negative lens element 54 is a negative meniscus lens element having a convex surface on the image side.

TABLE 10

SURFACE DATA

| Surf. No. | R | d | N (d) | ν (d) |
|---|---|---|---|---|
| 1 | 276.890 | 3.000 | 1.80610 | 40.9 |
| 2 | 127.962 | 9.494 | 1.49700 | 81.6 |
| 3 | 1476.190 | 0.100 | | |
| 4 | 172.079 | 9.121 | 1.49700 | 81.6 |
| 5 | −922.480 | d5 | | |
| 6 | 130.719 | 5.509 | 1.71736 | 29.5 |
| 7 | −271.448 | 3.169 | 1.74320 | 49.3 |
| 8 | 58.102 | d8 | | |
| 9 | 84.414 | 3.935 | 1.49700 | 81.6 |
| 10 | −427.703 | 1.694 | | |
| 11 | −76.955 | 1.450 | 1.80610 | 40.9 |
| 12 | 427.083 | 1.750 | | |
| 13 | 55.509 | 6.172 | 1.62004 | 36.3 |
| 14 | −95.120 | 1.450 | 1.72916 | 54.7 |
| 15 | 121.155 | 4.700 | | |
| 16 (diaphragm) | ∞ | d16 | | |
| 17 | 677.151 | 1.550 | 1.71736 | 29.5 |
| 18 | 80.575 | 0.700 | | |
| 19 | 117.012 | 6.286 | 1.58313 | 59.4 |
| 20 | −82.863 | 0.300 | | |
| 21 | 119.646 | 8.136 | 1.58913 | 61.2 |
| 22 | −40.943 | 1.400 | 1.74950 | 35.3 |
| 23 | −706.210 | 0.100 | | |
| 24 | 70.564 | 4.980 | 1.65844 | 50.9 |
| 25 | −247.208 | d25 | | |
| 26 | 140.606 | 1.300 | 1.83481 | 42.7 |
| 27 | 42.727 | 3.457 | | |
| 28 | −2015.067 | 4.946 | 1.71736 | 29.5 |
| 29 | −39.267 | 1.300 | 1.49700 | 81.6 |
| 30 | 2519.443 | 20.053 | | |
| 31 | −48.532 | 1.200 | 1.80400 | 46.6 |
| 32 | −153.423 | — | | |

TABLE 11

VARIOUS LENS-SYSTEM DATA
ZOOM RATIO 3.16

| | Short Focal Length Extremity | Intermediate Focal Length | Long Focal Length Extremity |
|---|---|---|---|
| FNO. | 4.6 | 5.1 | 5.7 |
| f | 153.70 | 274.98 | 485.40 |

TABLE 11-continued

VARIOUS LENS-SYSTEM DATA
ZOOM RATIO 3.16

| | Short Focal Length Extremity | Intermediate Focal Length | Long Focal Length Extremity |
|---|---|---|---|
| W | 7.9 | 4.4 | 2.5 |
| Y | 21.64 | 21.64 | 21.64 |
| fB | 49.43 | 63.48 | 89.50 |
| L | 290.99 | 337.65 | 371.92 |
| d5 | 36.234 | 104.733 | 156.731 |
| d8 | 43.068 | 21.232 | 3.500 |
| d16 | 31.940 | 25.687 | 13.033 |
| d25 | 23.059 | 15.269 | 1.900 |

TABLE 12

LENS GROUP DATA

| Lens Group | 1st Surface | Focal Length |
|---|---|---|
| 1 | 1 | 280.68 |
| 2 | 6 | −141.92 |
| 3 | 9 | −1151.46 |
| 4 | 17 | 55.68 |
| 5 | 26 | −45.27 |

[Numerical Embodiment 5]

Figure 25:
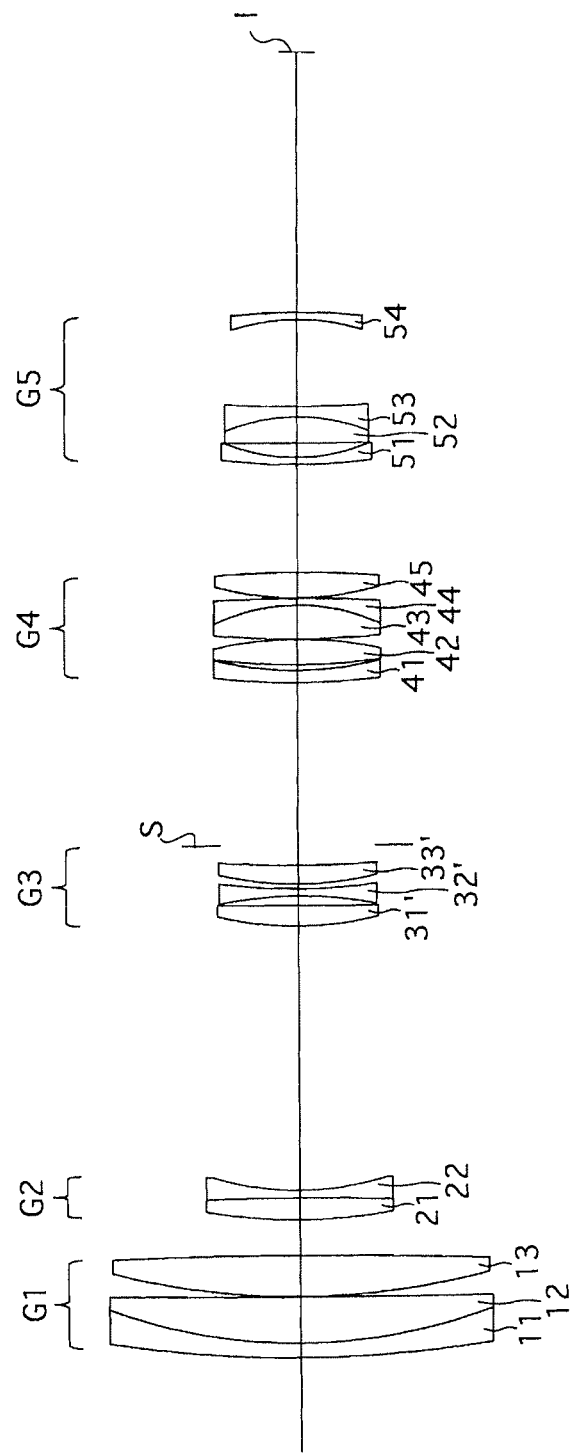
FIG. 25 is a lens arrangement of a fifth numerical embodiment of the zoom lens system, according to the present invention, when focused on an object at infinity at the short focal length extremity.
Figure 28:
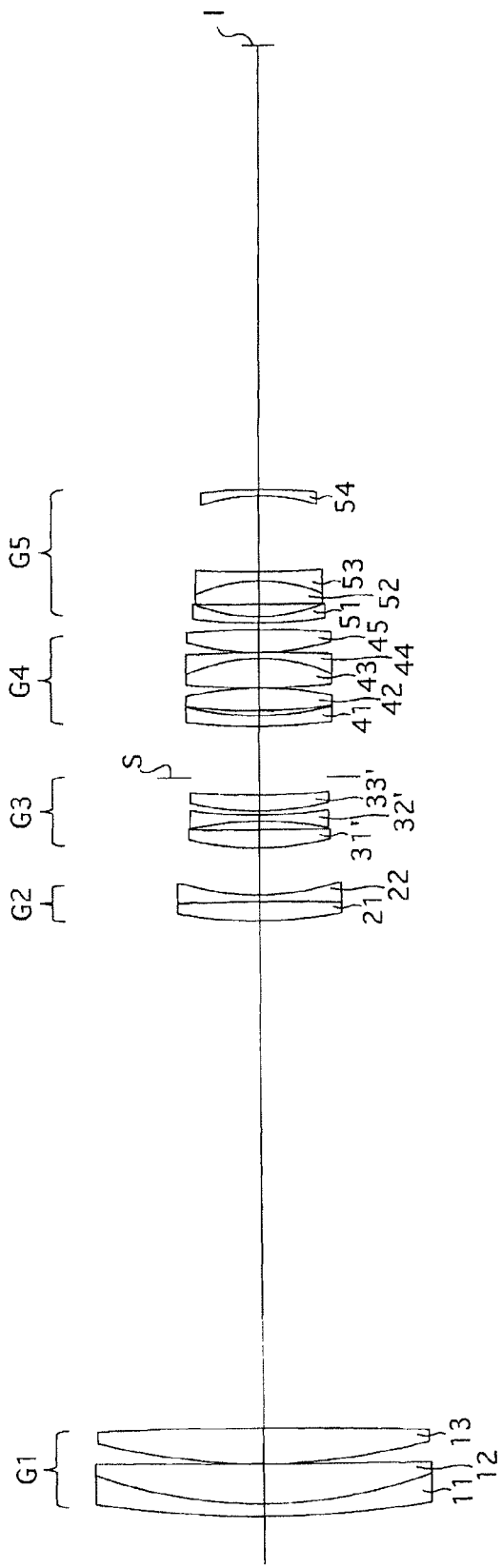
FIG. 28 is a lens arrangement of the fifth numerical embodiment when focused on an object at infinity at the long focal length extremity.
Figures 32A, 32B, 32C, 32D, 32E:
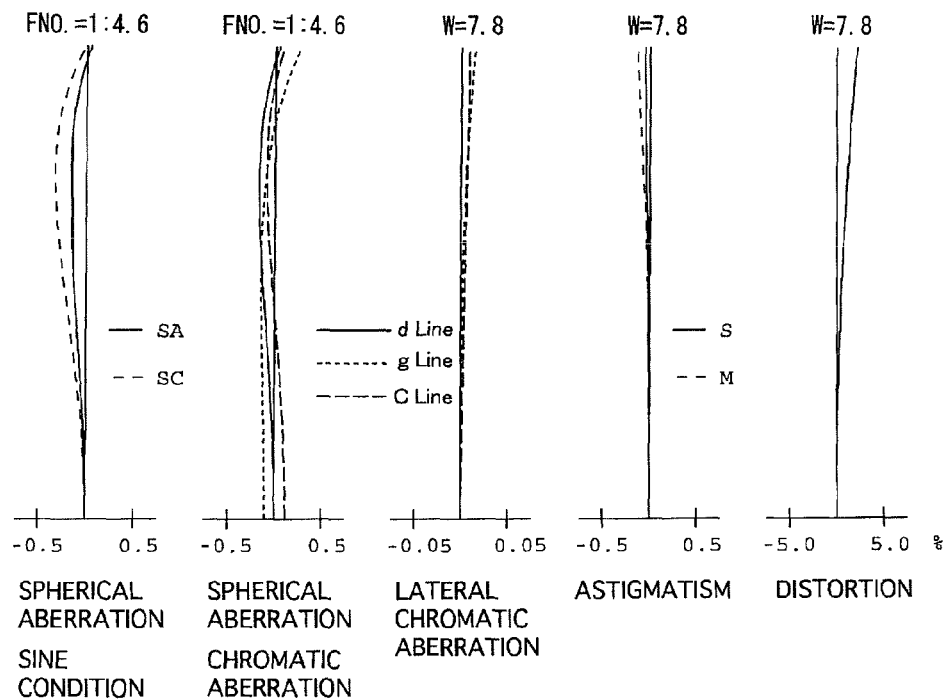
FIGS. 32A, 32B, 32C, 32D and 32E show various aberrations that occurred in the lens arrangement of FIG. 31.
Figure 33A:
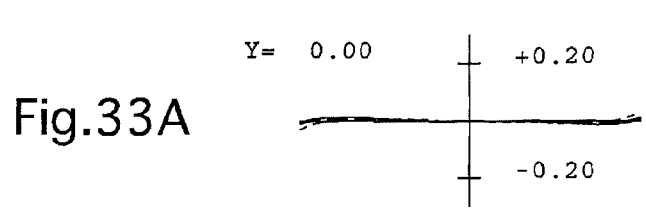
FIGS. 33A, 33B and 33C show lateral aberrations that occurred in the lens arrangement of FIG. 31.
Figure 33B:
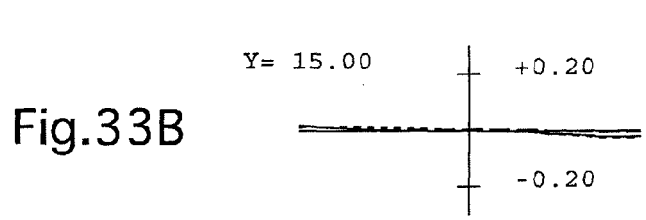
Figure 33C:
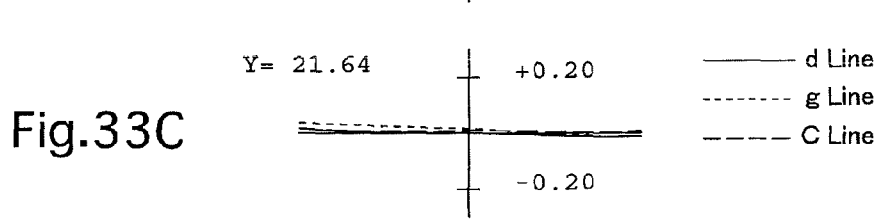

FIGS. 25 through 30C and Tables 13 through 15 show a fifth numerical embodiment of a zoom lens system according to the present invention. FIG. 25 is a lens arrangement of the zoom lens system when focused on an object at infinity at the short focal length extremity; FIGS. 26A, 26B, 26C, 26D and 26E various aberrations that occurred therein; FIGS. 27A, 27B and 27C show lateral aberrations that occurred therein; FIG. 28 is a lens arrangement of the zoom lens system when focused on an object at infinity at the long focal length extremity; FIGS. 29A, 29B, 29C, 29D and 29E show various aberrations that occurred therein; and FIGS. 30A, 30B and 30C show lateral aberrations that occurred therein. Table 13 shows the lens data, Table 14 shows various data, and Table 15 shows lens-group data.

The lens arrangement of the fifth numerical embodiment differs from the lens arrangement of the first numerical embodiment with respect to the following features:

(1) The negative meniscus lens element 11 and the positive meniscus lens element 12 of the first lens group G1 are cemented to each other.

(2) The third lens group G3 is configured of a positive meniscus lens element 31' having a convex surface on the object side, a biconcave negative lens element 32', and a positive meniscus lens element 33' having a convex surface on the object side, in that order from the object side.

(3) In the fifth lens group G5, the negative lens element 53 is a biconcave negative lens element, and the negative lens element 54 is a negative meniscus lens element having a convex surface on the image side.

TABLE 13

SURFACE DATA

| Surf. No. | R | d | N (d) | ν (d) |
|---|---|---|---|---|
| 1 | 252.584 | 3.100 | 1.80610 | 40.9 |
| 2 | 116.420 | 9.566 | 1.49700 | 81.6 |
| 3 | 3346.979 | 0.100 | | |

TABLE 13-continued

SURFACE DATA

| Surf. No. | R | d | N (d) | ν (d) |
|---|---|---|---|---|
| 4 | 156.028 | 8.668 | 1.49700 | 81.6 |
| 5 | −1042.449 | d5 | | |
| 6 | 113.388 | 4.558 | 1.72825 | 28.5 |
| 7 | −499.442 | 1.550 | 1.74320 | 49.3 |
| 8 | 61.920 | d8 | | |
| 9 | 71.297 | 4.197 | 1.49700 | 81.6 |
| 10 | 4696.152 | 2.019 | | |
| 11 | −82.677 | 1.500 | 1.78590 | 44.2 |
| 12 | 124.339 | 1.000 | | |
| 13 | 69.926 | 3.905 | 1.74950 | 35.3 |
| 14 | 241.306 | 4.120 | | |
| 15 (diaphragm) | ∞ | d15 | | |
| 16 | 156.185 | 2.500 | 1.76182 | 26.5 |
| 17 | 72.867 | 1.169 | | |
| 18 | 135.095 | 5.325 | 1.48749 | 70.2 |
| 19 | −78.891 | 0.100 | | |
| 20 | 215.140 | 6.978 | 1.62299 | 58.2 |
| 21 | −41.250 | 1.400 | 1.79952 | 42.2 |
| 22 | −300.059 | 0.100 | | |
| 23 | 64.592 | 5.335 | 1.58913 | 61.2 |
| 24 | −196.277 | d24 | | |
| 25 | 124.996 | 1.500 | 1.83481 | 42.7 |
| 26 | 40.795 | 2.917 | | |
| 27 | 1026.876 | 5.521 | 1.71736 | 29.5 |
| 28 | −39.392 | 2.200 | 1.49700 | 81.6 |
| 29 | 262.270 | 18.075 | | |
| 30 | −45.243 | 1.500 | 1.81600 | 46.6 |
| 31 | −130.110 | — | | |

TABLE 14

VARIOUS LENS-SYSTEM DATA
ZOOM RATIO 2.86

| | Short Focal Length Extremity | Intermediate Focal Length | Long Focal Length Extremity |
|---|---|---|---|
| FNO. | 4.6 | 5.2 | 5.7 |
| f | 153.69 | 260.00 | 439.50 |
| W | 7.8 | 4.7 | 2.8 |
| Y | 21.64 | 21.64 | 21.64 |
| fB | 49.15 | 65.32 | 91.63 |
| L | 266.79 | 301.42 | 336.79 |
| d5 | 7.429 | 68.732 | 121.137 |
| d8 | 54.983 | 28.314 | 11.274 |
| d15 | 33.852 | 25.901 | 12.241 |
| d24 | 22.471 | 14.250 | 1.600 |

TABLE 15

LENS GROUP DATA

| Lens Group | 1st Surface | Focal Length |
|---|---|---|
| 1 | 1 | 248.58 |
| 2 | 6 | −187.34 |
| 3 | 9 | −1008.59 |
| 4 | 16 | 57.85 |
| 5 | 25 | −42.52 |

[Numerical Embodiment 6]

Figure 34:
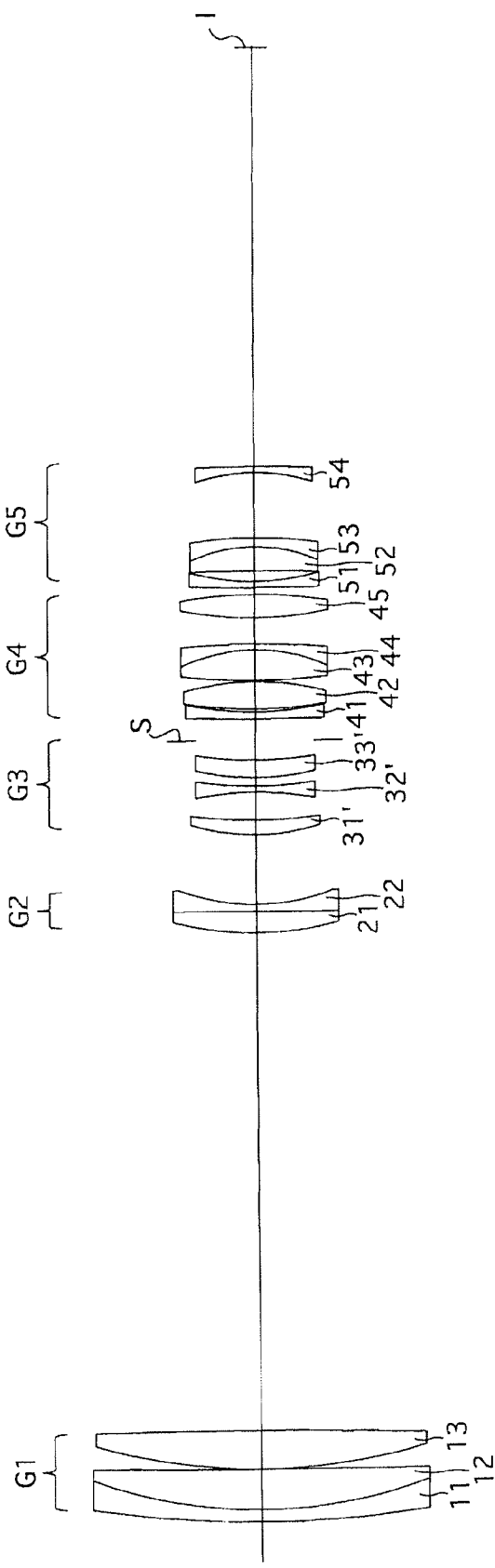
FIG. 34 is a lens arrangement of the sixth numerical embodiment when focused on an object at infinity at the long focal length extremity.

FIGS. 31 through 36C and Tables 16 through 18 show a sixth numerical embodiment of a zoom lens system according to the present invention. FIG. 31 is a lens arrangement of the zoom lens system when focused on an object at infinity at the short focal length extremity; FIGS. 32A, 32B, 32C, 32D and 32E show various aberrations that occurred therein; FIGS. 33A, 33B and 33C show lateral aberrations that occurred therein; FIG. 34 is a lens arrangement of the zoom lens system when focused on an object at infinity at the long focal length extremity; FIGS. 35A, 35B, 35C, 35D and 35E show various aberrations that occurred therein; and FIGS. 36A, 36B and 36C show lateral aberrations that occurred therein. Table 16 shows the lens data, Table 17 shows various data, and Table 18 shows lens-group data.

The lens arrangement of the sixth numerical embodiment differs from the lens arrangement of the first numerical embodiment with respect to the following features:

(1) The negative meniscus lens element 11 and the positive meniscus lens element 12 of the first lens group G1 are cemented to each other.

(2) In the second lens group G2, the positive lens element 21 is a positive meniscus lens element having a convex surface on the object side, and the negative lens element 22 is a negative meniscus lens element having a convex surface on the object side.

(3) The third lens group G3 is configured of a positive meniscus lens element 31' having a convex surface on the object side, a biconcave negative lens element 32', and a positive meniscus lens element 33' having a convex surface on the object side, in that order from the object side.

(4) In the fifth lens group G5, the positive lens element 52 is a positive meniscus lens element having a convex surface on the image side, and the negative lens element 54 is a negative meniscus lens element having a convex surface on the image side.

TABLE 16

SURFACE DATA

| Surf. No. | R | d | N (d) | ν (d) |
|---|---|---|---|---|
| 1 | 255.245 | 2.950 | 1.80610 | 40.9 |
| 2 | 113.275 | 9.793 | 1.49700 | 81.6 |
| 3 | 2531.658 | 0.100 | | |
| 4 | 136.873 | 9.333 | 1.49700 | 81.6 |
| 5 | −1498.310 | d5 | | |
| 6 | 77.961 | 5.016 | 1.72825 | 28.5 |
| 7 | 5708.122 | 1.700 | 1.74320 | 49.3 |
| 8 | 50.273 | d8 | | |
| 9 | 50.203 | 3.532 | 1.49700 | 81.6 |
| 10 | 118.444 | 6.578 | | |
| 11 | −77.768 | 1.450 | 1.77250 | 49.6 |
| 12 | 99.137 | 2.000 | | |
| 13 | 60.096 | 4.204 | 1.72047 | 34.7 |
| 14 | 92.196 | 4.700 | | |
| 15 (diaphragm) | ∞ | d15 | | |
| 16 | 394.826 | 1.741 | 1.80000 | 29.9 |
| 17 | 73.088 | 0.700 | | |
| 18 | 101.742 | 6.610 | 1.48749 | 70.2 |
| 19 | −62.769 | 0.300 | | |
| 20 | 152.246 | 7.212 | 1.62299 | 58.2 |
| 21 | −41.067 | 1.400 | 1.79952 | 42.2 |
| 22 | −196.568 | 6.292 | | |
| 23 | 87.318 | 5.604 | 1.58913 | 61.2 |
| 24 | −101.994 | d24 | | |
| 25 | 453.753 | 1.500 | 1.83481 | 42.7 |
| 26 | 56.304 | 2.524 | | |
| 27 | −490.756 | 5.766 | 1.71736 | 29.5 |
| 28 | −37.096 | 2.140 | 1.49700 | 81.6 |
| 29 | −102.188 | 15.525 | | |
| 30 | −45.286 | 1.400 | 1.80400 | 46.6 |
| 31 | −309.910 | — | | |

TABLE 17

VARIOUS LENS-SYSTEM DATA
ZOOM RATIO 2.86

|  | Short Focal Length Extremity | Intermediate Focal Length | Long Focal Length Extremity |
|---|---|---|---|
| FN0. | 4.6 | 5.2 | 5.8 |
| f | 153.70 | 260.00 | 439.00 |
| W | 7.8 | 4.7 | 2.8 |
| Y | 21.64 | 21.64 | 21.64 |
| fB | 50.20 | 65.28 | 89.00 |
| L | 275.65 | 311.01 | 341.55 |
| d5 | 20.778 | 75.934 | 119.217 |
| d8 | 49.195 | 29.403 | 16.660 |
| d15 | 19.598 | 14.052 | 5.000 |
| d24 | 25.807 | 16.275 | 1.600 |

TABLE 18

LENS GROUP DATA

| Lens Group | 1$^{st}$ Surface | Focal Length |
|---|---|---|
| 1 | 1 | 239.72 |
| 2 | 6 | −203.92 |
| 3 | 9 | −146.57 |
| 4 | 16 | 52.09 |
| 5 | 25 | −50.26 |

[Numerical Embodiment 7]

Figure 37:
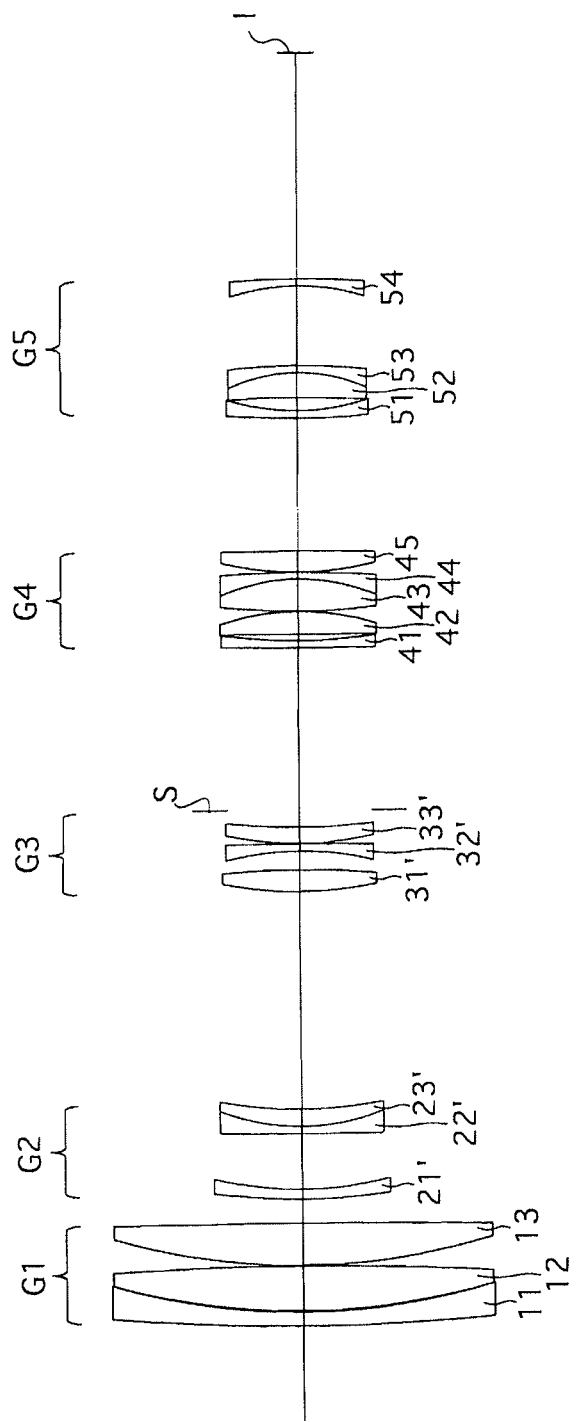
FIG. 37 is a lens arrangement of a seventh numerical embodiment of the zoom lens system, according to the present invention, when focused on an object at infinity at the short focal length extremity.
Figures 38A, 38B, 38C, 38D, 38E:
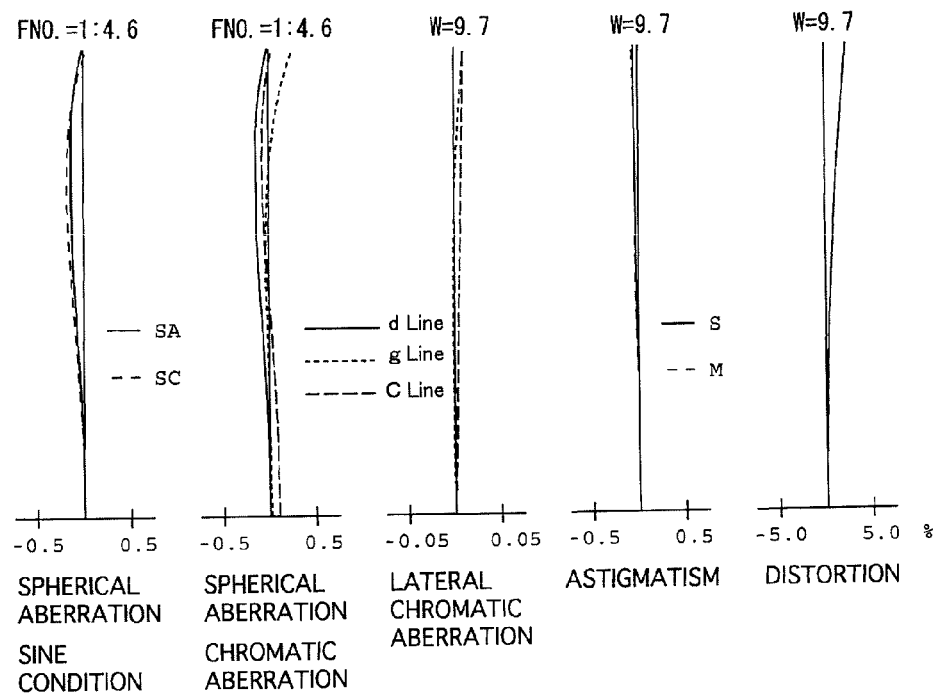
FIGS. 38A, 38B, 38C, 38D and 38E show various aberrations that occurred in the lens arrangement of FIG. 37.
Figure 39A:
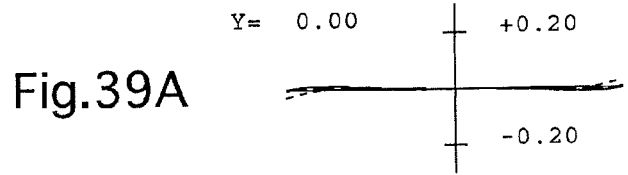
FIGS. 39A, 39B and 39C show lateral aberrations that occurred in the lens arrangement of FIG. 37.
Figure 39B:
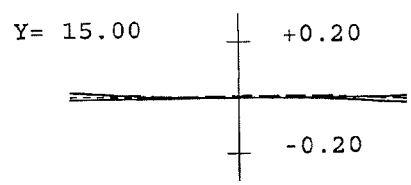
Figure 39C:
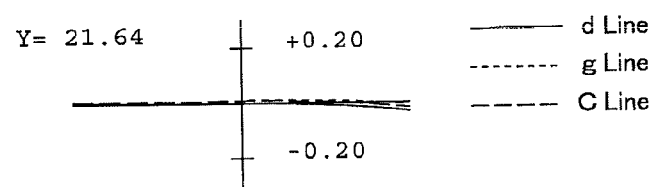
Figure 40:
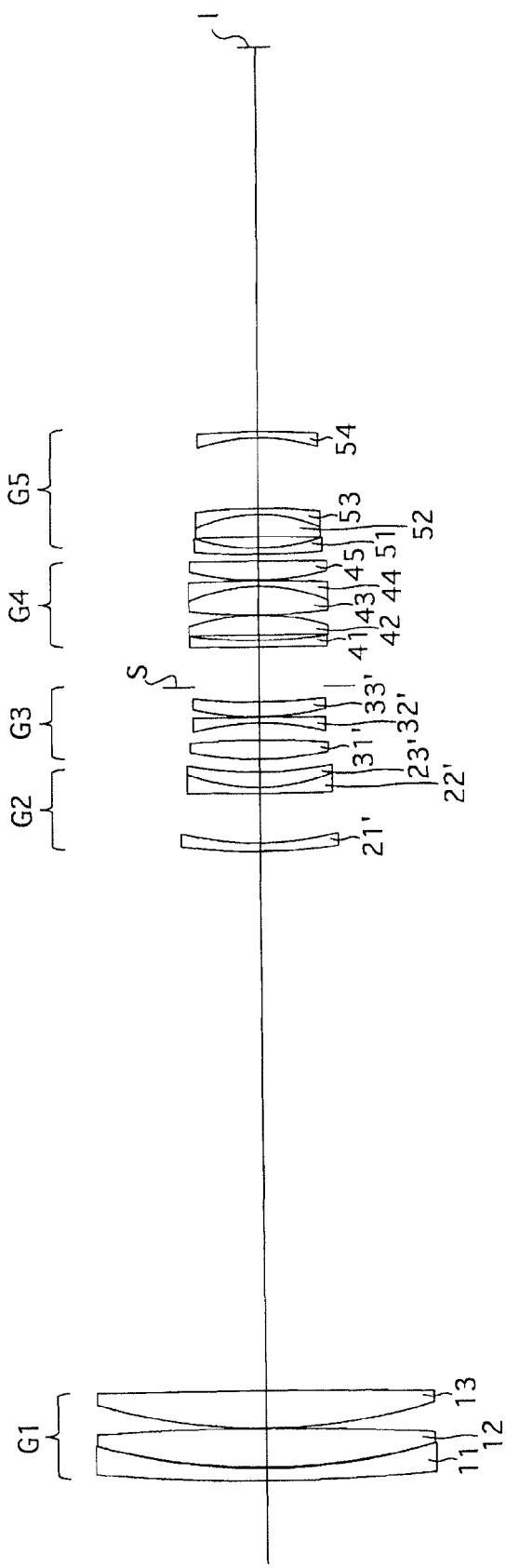
FIG. 40 is a lens arrangement of the seventh numerical embodiment when focused on an object at infinity at the long focal length extremity.
Figures 41A, 41B, 41C, 41D, 41E:
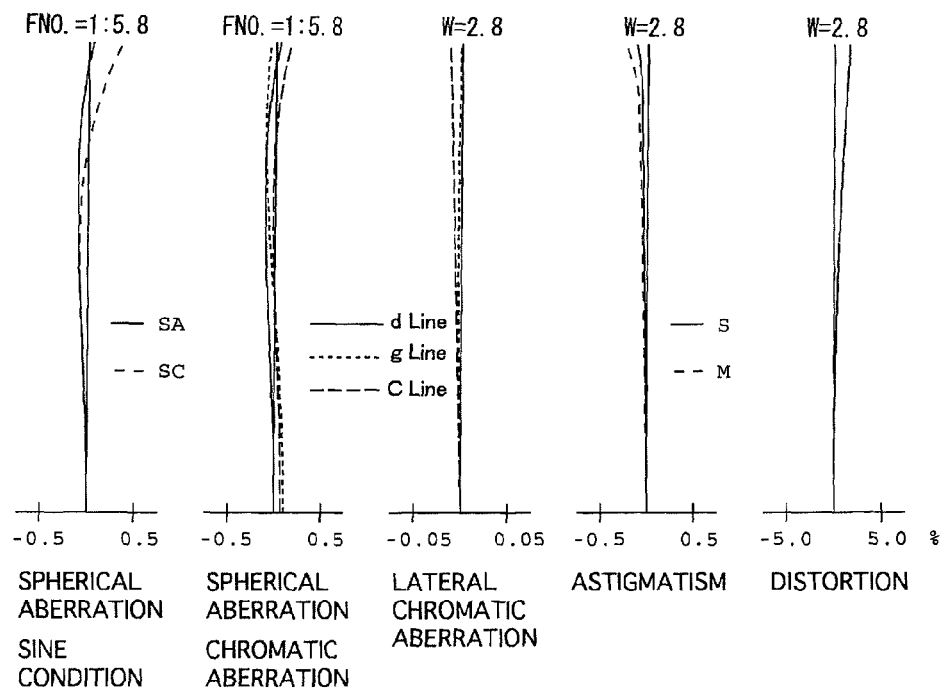
FIGS. 41A, 41B, 41C, 41D and 41E show various aberrations that occurred in the lens arrangement of FIG. 40.
Figure 42A:
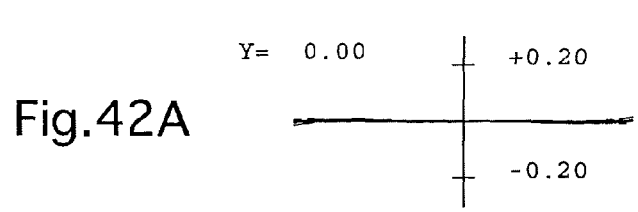
FIGS. 42A, 42B and 42C show lateral aberrations that occurred in the lens arrangement of FIG. 40.
Figure 42B:
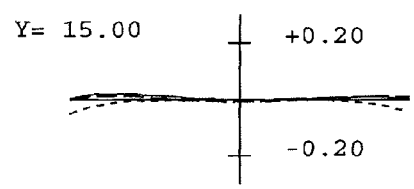
Figure 42C:
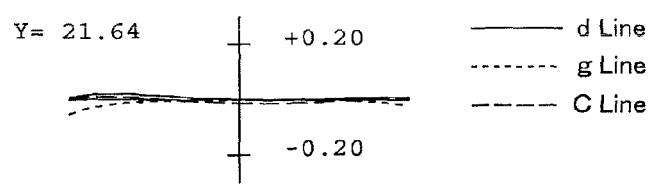

FIGS. 37 through 42C and Tables 19 through 21 show a seventh numerical embodiment of a zoom lens system according to the present invention. FIG. 37 is a lens arrangement of the zoom lens system when focused on an object at infinity at the short focal length extremity; FIGS. 38A, 38B, 38C, 38D and 38E show various aberrations that occurred therein; FIGS. 39A, 39B and 39C show lateral aberrations that occurred therein; FIG. 40 is a lens arrangement of the zoom lens system when focused on an object at infinity at the long focal length extremity; FIGS. 41A, 41B, 41C, 41D and 41E show various aberrations that occurred therein; and FIGS. 42A, 42B and 42C show lateral aberrations that occurred therein. Table 19 shows the lens data, Table 20 shows various data, and Table 21 shows lens-group data.

The lens arrangement of the seventh numerical embodiment differs from the lens arrangement of the first numerical embodiment with respect to the following features:

(1) The positive lens element 12 of the first lens group G1 is a biconvex positive lens element.

(2) The second lens group G2 is configured of a negative meniscus lens element 21' having a convex surface on the object side, a negative meniscus lens element 22' having a convex surface on the object side, and a positive meniscus lens element 23' having a convex surface on the object side, in that order from the object side. The negative meniscus lens element 22' and the positive meniscus lens element 23' are cemented to each other.

(3) The third lens group G3 has a positive refractive power (rather than a negative refractive power). This positive third lens group G3 is configured of a biconvex positive lens element 31', a negative meniscus lens element 32' having a convex surface on the image side, and a positive meniscus lens element 33' having a convex surface on the object side, in that order from the object side.

(4) The positive lens element 42 of the fourth lens group G4 is a positive meniscus lens element having a convex surface on the image side.

(5) In the fifth lens group G5, the positive lens element 52 is a positive meniscus lens element having a convex surface on the image side, and the negative lens element 54 is a negative meniscus lens element having a convex surface on the image side.

TABLE 19

SURFACE DATA

| Surf. No. | R | d | N (d) | ν (d) |
|---|---|---|---|---|
| 1 | 456.569 | 2.900 | 1.79952 | 42.2 |
| 2 | 142.163 | 0.300 |  |  |
| 3 | 149.277 | 9.323 | 1.49700 | 81.6 |
| 4 | −633.800 | 0.100 |  |  |
| 5 | 140.083 | 8.804 | 1.49700 | 81.6 |
| 6 | −2038.146 | d6 |  |  |
| 7 | 138.728 | 2.024 | 1.74950 | 35.3 |
| 8 | 76.688 | 11.632 |  |  |
| 9 | 720.104 | 1.500 | 1.61800 | 63.4 |
| 10 | 47.161 | 3.592 | 1.76182 | 26.5 |
| 11 | 91.497 | d11 |  |  |
| 12 | 80.521 | 4.571 | 1.49700 | 81.6 |
| 13 | −176.382 | 3.952 |  |  |
| 14 | −61.974 | 1.500 | 1.77250 | 49.6 |
| 15 | −599.452 | 0.100 |  |  |
| 16 | 74.144 | 3.355 | 1.74950 | 35.3 |
| 17 | 150.056 | 3.500 |  |  |
| 18 (diaphragm) | ∞ | d18 |  |  |
| 19 | 2625.497 | 1.500 | 1.78472 | 25.7 |
| 20 | 117.351 | 1.309 |  |  |
| 21 | −4704.844 | 4.666 | 1.48749 | 70.2 |
| 22 | −54.858 | 0.100 |  |  |
| 23 | 152.559 | 6.683 | 1.62299 | 58.2 |
| 24 | −41.191 | 1.400 | 1.79952 | 42.2 |
| 25 | −248.043 | 0.100 |  |  |
| 26 | 68.815 | 4.389 | 1.58913 | 61.2 |
| 27 | −633.278 | d27 |  |  |
| 28 | 200.837 | 1.500 | 1.83481 | 42.7 |
| 29 | 48.720 | 2.698 |  |  |
| 30 | −313.694 | 5.228 | 1.69895 | 30.1 |
| 31 | −35.565 | 1.500 | 1.49700 | 81.6 |
| 32 | −136.390 | 16.570 |  |  |
| 33 | −45.567 | 1.500 | 1.81600 | 46.6 |
| 34 | −167.314 | — |  |  |

TABLE 20

VARIOUS LENS-SYSTEM DATA
ZOOM RATIO 3.54

|  | Short Focal Length Extremity | Intermediate Focal Length | Long Focal Length Extremity |
|---|---|---|---|
| FN0. | 4.6 | 5.3 | 5.8 |
| f | 123.50 | 232.00 | 437.00 |
| W | 9.7 | 5.2 | 2.8 |
| Y | 21.64 | 21.64 | 21.64 |
| fB | 41.50 | 60.14 | 92.01 |
| L | 259.68 | 299.75 | 339.90 |
| d6 | 5.000 | 70.129 | 127.521 |
| d11 | 45.297 | 20.245 | 3.000 |
| d18 | 33.932 | 24.195 | 9.470 |
| d27 | 27.656 | 18.747 | 1.600 |

TABLE 21

LENS GROUP DATA

| Lens Group | 1st Surface | Focal Length |
|---|---|---|
| 1 | 1 | 247.23 |
| 2 | 7 | −111.83 |
| 3 | 12 | 303.44 |
| 4 | 19 | 65.75 |
| 5 | 28 | −49.25 |

The values of each condition of each numerical embodiment are shown in Table 22. It should be noted that in regard to the seventh numerical embodiment, the corresponding values for conditions (10) through (12) cannot be calculated since the lens arrangement of the second lens group G2, which is a premise therefor, is different.

TABLE 25

|  | Embod. 1 | Embod. 2 | Embod. 3 | Embod. 4 |
|---|---|---|---|---|
| Cond. (1) | −4.957 | −4.650 | −4.987 | −6.200 |
| Cond. (2) | −0.422 | −0.516 | −0.291 | −0.133 |
| Cond. (3) | 2.367 | 2.021 | 2.257 | 1.613 |
| Cond. (4) | −4.390 | −4.160 | −3.916 | −2.839 |
| Cond. (5) | 35.30 | 37.20 | 40.90 | 40.90 |
| Cond. (6) | 78.15 | 84.85 | 81.60 | 81.60 |
| Cond. (7) | 0.277 | 0.184 | 0.341 | 0.443 |
| Cond. (8) | 81.60 | 74.70 | 81.60 | 81.60 |
| Cond. (9) |  |  |  |  |
| (Left Side) | 0.538 | 0.539 | 0.538 | 0.538 |
| (Right Side) | 0.516 | 0.528 | 0.516 | 0.516 |
| Cond. (10) |  |  |  |  |
| (Left Side) | 29.5 | 29.5 | 29.5 | 29.5 |
| (Right Side) | 44.2 | 49.3 | 49.3 | 49.3 |
| Cond. (11) |  |  |  |  |
| (Left Side) | 1.71736 | 1.71736 | 1.71736 | 1.71736 |
| (Right Side) | 1.78590 | 1.74320 | 1.74320 | 1.74320 |
| Cond. (12) |  |  |  |  |
| (Left Side) | 0.563 | 0.553 | 0.553 | 0.553 |
| (Right Side) | 0.566 | 0.558 | 0.558 | 0.558 |
| Cond. (13) | −1.504 | −1.495 | −1.642 | −1.978 |

|  | Embod. 5 | Embod. 6 | Embod. 7 |
|---|---|---|---|
| Cond. (1) | −5.846 | −4.769 | −5.020 |
| Cond. (2) | −0.152 | −1.049 | 0.407 |
| Cond. (3) | 0.893 | 1.318 | 1.715 |
| Cond. (4) | −2.065 | −4.040 | −2.142 |
| Cond. (5) | 40.90 | 40.90 | 42.20 |
| Cond. (6) | 81.60 | 81.60 | 81.60 |
| Cond. (7) | 0.425 | 0.309 | 0.336 |
| Cond. (8) | 81.60 | 81.60 | 81.60 |
| Cond. (9) |  |  |  |
| (Left Side) | 0.538 | 0.538 | 0.538 |
| (Right Side) | 0.516 | 0.516 | 0.516 |
| Cond. (10) |  |  |  |
| (Left Side) | 28.5 | 28.5 | — |
| (Right Side) | 49.3 | 49.3 | — |
| Cond. (11) |  |  |  |
| (Left Side) | 1.72825 | 1.72825 | — |
| (Right Side) | 1.74320 | 1.74320 | — |
| Cond. (12) |  |  |  |
| (Left Side) | 0.553 | 0.553 | — |
| (Right Side) | 0.558 | 0.558 | — |
| Cond. (13) | −1.327 | −1.176 | −2.211 |

As can be understood from Table 22, the first through sixth numerical embodiments satisfy conditions (1) through (13), and the seventh numerical embodiment satisfies conditions (1) through (9), and (13). Furthermore, as can be understood from the various aberration diagrams and lateral aberration diagrams, the various aberrations and lateral aberrations are favorably corrected, even in a zoom lens system in which the focal length exceeds 400 mm at the long focal length extremity and has a fast f-number.

Even if a lens element or lens group having effectively no refractive power were to be added to the zoom lens system included in the scope of the claims of the present invention, such a zoom lens system would still remain within the technical scope of the present invention (and would not be excluded from the technical scope of the present invention).

INDUSTRIAL APPLICABILITY

The zoom lens system of the present invention is suitable for use in a lens interchangeable camera such as, e.g., a digital SLR camera or other photographing apparatus.

REFERENCE SIGNS LIST

G1 Positive first lens group
11 Negative lens element
12 Positive lens element
13 Positive lens element
G2 Negative second lens group
21 Positive lens element (positive lens element having a convex surface on the object side)
22 Negative lens element (negative lens element having a concave surface on the image side)
21' Negative lens element
22' Negative lens element
23' Positive lens element
G3 Positive or Negative third lens group
31 Positive lens element
32 Negative lens element
33 Positive lens element
34 Negative lens element
31' Positive lens element
32' Negative lens element
33' Positive lens element
G4 Positive fourth lens group
41 Negative lens element
42 Positive lens element
43 Positive lens element
44 Negative lens element
45 Positive lens element
G5 Negative fifth lens group
51 Negative lens element
52 Positive lens element
53 Negative lens element
54 Negative lens element
S Diaphragm
I Imaging surface

The invention claimed is:
1. A zoom lens system comprising a positive first lens group, a negative second lens group, a third lens group which includes at least one positive lens element or one negative lens element, a positive fourth lens group, and a negative fifth lens group, in that order from the object side,
wherein at least said first lens group, said second lens group, said fourth lens group and said fifth lens group are moved during zooming from the short focal length extremity to the long focal length extremity, and wherein the following conditions (1) and (2) are satisfied:

$$-6.5 < f1/f5 < -4.6 \quad (1),$$

and $$-1.2 < fw/f3 < 0.7 \quad (2),$$

wherein f1 designates the focal length of the first lens group,
f3 designates the focal length of the third lens group,
f5 designates the focal length of the fifth lens group, and
fw designates the focal length of the entire zoom lens system at the short focal length extremity.

2. The zoom lens system according to claim 1, wherein said third lens group comprises a positive lens element, a negative lens element, and a positive lens element or a positive cemented lens, in that order from the object side, wherein the following conditions (3) and (4) are satisfied:

$$0.75 < f33/f31 < 2.4 \quad (3),$$

and $$-4.5 < f33/f32 < -1.9 \quad (4),$$

wherein f31 designates the focal length of the positive lens element that is provided closest to the object side within said third lens group,
f32 designates the focal length of the second lens element, which is a negative lens element, provided closest to the object side within said third lens group, and
f33 designates the focal length of the positive lens element or the positive cemented lens that is provided closest to the image side within said third lens group.

3. The zoom lens system according to claim 1, wherein said third lens group is stationary relative to an imaging surface during zooming from the short focal length extremity to the long focal length extremity.

4. The zoom lens system according to claim 1, wherein said first lens group comprises one negative lens element and two or more positive lens elements, and wherein the following conditions (5) and (6) are satisfied:

$$33 < vd1n < 45 \quad (5),$$

and $$77 < vd1p \quad (6),$$

wherein vd1n designates the Abbe number with respect to the d-line of the negative lens element provided within said first lens group, and
vd1p designates the average Abbe number with respect to the d-line of two or more positive lens elements provided within said first lens group.

5. The zoom lens system according to claim 1, wherein, during focusing on an object at infinity to an object at a close distance, said fifth lens group serves as a focusing lens group which moves in the optical axis direction, wherein said fifth lens group, which is said focusing lens group, comprises a negative lens element, a cemented lens, and a negative lens element, in that order from the object side, and wherein the following condition (7) is satisfied:

$$0.15 < |d53/f5| < 0.45 \quad (7),$$

wherein d53 designates the axial distance from the cemented lens to the negative lens element that is closest to the image side within said fifth lens group, and
f5 designates the focal length of said fifth lens group.

6. The zoom lens system according to claim 5, wherein the cemented lens provided in said fifth lens group comprises a positive lens element and a negative lens element, wherein conditions (8) and (9) are satisfied:

$$vd5n > 72 \quad (8),$$

and $$\theta gF5n > -0.0017 * vd5n + 0.655 \quad (9),$$

wherein vd5n designates the Abbe number with respect to the d-line of the negative lens element of the cemented lens provided within the fifth lens group, and
$\theta gF5n$ designates the partial dispersion ratio of the negative lens element of the cemented lens provided within the fifth lens group.

7. The zoom lens system according to claim 1, wherein said second lens group comprises a cemented lens having a positive lens element having a convex surface on the object side and a negative lens element having a concave surface on the image side, in that order from the object side, wherein the following condition (10) is satisfied:

$$vd21 < vd22 \quad (10),$$

wherein vd21 designates the Abbe number with respect to the d-line of the positive lens element of the cemented lens provided within the second lens group, and
vd22 designates the Abbe number with respect to the d-line of the negative lens element of the cemented lens provided within the second lens group.

8. The zoom lens system according to claim 1, wherein said second lens group comprises a negative lens element and a cemented lens, in that order from the object side, wherein the cemented lens provided on the image side includes a negative lens element and a positive lens element.

* * * * *